United States Patent
Doshita et al.

(10) Patent No.: US 9,272,915 B2
(45) Date of Patent: Mar. 1, 2016

(54) FLAKY MESOPOROUS PARTICLES, AND METHOD FOR PRODUCING THE SAME

(75) Inventors: Kazuhiro Doshita, Tokyo (JP); Toshitaka Furuichi, Tokyo (JP); Kosei Shimokawa, Tokyo (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 0 days.

(21) Appl. No.: 13/978,818

(22) PCT Filed: Jan. 11, 2012

(86) PCT No.: PCT/JP2012/000128
§ 371 (c)(1),
(2), (4) Date: Jul. 9, 2013

(87) PCT Pub. No.: WO2012/096171
PCT Pub. Date: Jul. 19, 2012

(65) Prior Publication Data
US 2013/0288055 A1 Oct. 31, 2013

(30) Foreign Application Priority Data
Jan. 11, 2011 (JP) .................................. 2011-003417

(51) Int. Cl.
*C01B 33/12* (2006.01)
*B01J 20/30* (2006.01)
(Continued)

(52) U.S. Cl.
CPC ............ *C01B 33/12* (2013.01); *B01J 20/28083* (2013.01); *B01J 20/3085* (2013.01); *C01B 13/14* (2013.01); *C01F 7/02* (2013.01); *C01F 7/021* (2013.01); *C01F 17/0043* (2013.01); *C01G 19/02* (2013.01); *C01G 23/047* (2013.01); *C01G 23/053* (2013.01); *C01P 2004/03* (2013.01);
(Continued)

(58) Field of Classification Search
None
See application file for complete search history.

(56) References Cited

U.S. PATENT DOCUMENTS

| 4,925,704 A | 5/1990 | Sato et al. |
| 5,201,929 A | 4/1993 | Mizuno et al. |

(Continued)

FOREIGN PATENT DOCUMENTS

| JP | 4-042828 | 2/1992 |
| JP | 7-315859 | 12/1995 |

(Continued)

OTHER PUBLICATIONS

Machine translation JP2006-151799 (2006).*

(Continued)

*Primary Examiner* — Alexandre Ferre
(74) *Attorney, Agent, or Firm* — Hamre, Schumann, Mueller & Larson, P.C.

(57) ABSTRACT

Provided is a mesoporous particle having a flaky shape, having a single-layer structure, having a thickness of 0.1 μm to 3 μm, and having an average pore diameter of 10 nm or more. The mesoporous particle can be obtained by a production method including: feeding a metal oxide sol having a pH of 7 or higher and containing metal oxide colloidal particles as dispersoids and water as a dispersion medium, into a liquid containing a water-miscible solvent having a relative permittivity of 30 or lower (protic solvent) or of 40 or lower (aprotic solvent) at 20° C., and thereby forming a flaky aggregate of the metal oxide colloidal particles in the liquid; and subjecting the aggregate to treatment such as drying and heating, and thereby converting the aggregate into a flaky particle that is insoluble in water.

22 Claims, 9 Drawing Sheets

(51) Int. Cl.
*B01J 20/28* (2006.01)
*C01B 13/14* (2006.01)
*C01G 19/02* (2006.01)
*C01G 23/053* (2006.01)
*C01F 7/02* (2006.01)
*C01F 17/00* (2006.01)
*C01G 23/047* (2006.01)

(52) U.S. Cl.
CPC ......... *C01P 2004/20* (2013.01); *C01P 2006/12* (2013.01); *C01P 2006/14* (2013.01); *C01P 2006/16* (2013.01); *Y10T 428/2982* (2015.01)

(56) References Cited

U.S. PATENT DOCUMENTS

| | | | |
|---|---|---|---|
| 6,358,495 | B1* | 3/2002 | Nishihama et al. ............. 424/59 |
| 2003/0180480 | A1* | 9/2003 | Fruge et al. .................. 428/32.1 |
| 2007/0249736 | A1* | 10/2007 | Watanabe et al. .............. 516/81 |
| 2008/0175783 | A1 | 7/2008 | Park et al. |
| 2009/0142565 | A1* | 6/2009 | Takahashi et al. ............ 428/220 |
| 2010/0311871 | A1 | 12/2010 | Suemura et al. |

FOREIGN PATENT DOCUMENTS

| | | |
|---|---|---|
| JP | 2002-080205 | 3/2002 |
| JP | 2004-026614 | 1/2004 |
| JP | 2006-151799 | 6/2006 |
| JP | 2007-112948 | 5/2007 |
| JP | 2007-176783 | 7/2007 |
| WO | 2009/101974 | 8/2009 |

OTHER PUBLICATIONS

Machine translation JP 2007-112948 (2007).*
Extended European Search Report issued in corresponding European Patent Application Serial No. 12733860.6, Jun. 1, 2015, 9 pages.
Form PTO-892 in co-pending U.S. Appl. No. 13/979,060 on Jun. 24, 2015, 1 page.

* cited by examiner

FLAKY MESOPOROUS PARTICLES, AND METHOD FOR PRODUCING THE SAME

TECHNICAL FIELD

The present invention relates to mesoporous particles as typified by mesoporous silica, and more particularly relates to flaky mesoporous particles adapted to be blended with matrix materials.

BACKGROUND ART

Mesoporous silica is porous silica having mesopores with a diameter ranging from 2 nm to 50 nm, and is expected to be used, for example, as a carrier for functional materials or as an adsorbent. Known methods for producing the mesoporous silica include sol-gel methods using a surfactant micelle as a template, and methods forming a layered polysilicate as an intermediate.

Typical examples of silica-based particles currently mass-produced include glass flakes (scale-like pieces of glass). The glass flakes are used by being blended with matrix materials such as resin molded bodies and cosmetics. Flaky particles have a larger surface area than spherical particles. In addition, when a thin coating film is formed by a composition for application blended with flaky particles, the flaky particles are oriented in the coating film in such a manner that the principal surfaces of the flaky particles are parallel to the surface of the coating film, and a large proportion of the base material to which the coating film has been applied is coated with the distributed flaky particles. For these reasons, the flaky shape of particles is desirable in order to impart desired functions to matrix materials.

However, it has not been reported thus far that flaky mesoporous silica has been obtained which has mesopores suitable for treatments such as adsorption and decomposition of macromolecules such as proteins, and which is adapted to be blended with matrix materials.

The shape of mesoporous silica obtained by conventional sol-gel methods using a surfactant micelle as a template has been limited to a rod shape. In response, Patent Literature 1 discloses that sheet-shaped mesoporous silica can be obtained by using a surfactant that can form a ribbon phase or a nematic phase. However, the thickness of the sheet-shaped mesoporous silica obtained by this method is only less than 50 nm (claim 2 of Patent Literature 1). Such a thin sheet material is easily deformed, and is thus difficult to blend with matrix materials without any change in the shape.

In addition, in multi-layer mesoporous silica obtained by methods forming a layered polysilicate as an intermediate, pore channels extend along interlayer portions of the multi-layer structure, and therefore, surfaces that allow access to the mesopores are limited to only surfaces on which the interlayer portions are exposed. Accordingly, in the case of mesoporous silica having a structure composed of tabular crystals layered on each other, the mesopores cannot be accessed from the widest principal surface of the mesoporous silica. This makes it more likely that the exertion of functions via the mesopores is restricted. Also in view of mechanical strength, a multi-layer body has a problem in that part of the layers is likely to be separated by a stress applied when the multi-layer body is blended with a matrix material or when the matrix material blended with the multi-layer body is molded. The multi-layer structure having pore channels including mesopores and formed along the interlayer portions is not suitable as a basic structure of flaky mesoporous silica to be blended with matrix materials.

CITATION LIST

Patent Literature

Patent Literature 1: JP 2007-176783 A

SUMMARY OF INVENTION

Technical Problem

The present invention aims to provide a flaky mesoporous particle that has mesopores suitable for treatments such as adsorption and decomposition of macromolecules such as proteins, and that is adapted to be blended with matrix materials.

Solution to Problem

The present invention provides a mesoporous particle having a flaky shape, having a single-layer structure, having a thickness of 0.1 μm to 3 μm, and having an average pore diameter of 10 nm or more.

In another aspect, the present invention provides a suitable method for producing the mesoporous particle of the present invention, and the method includes the steps of: feeding a metal oxide sol having a pH of 7 or higher and containing metal oxide colloidal particles as dispersoids and water as a dispersion medium, into a liquid containing a water-miscible solvent that is a protic solvent having a relative permittivity (dielectric constant) of 30 or lower at 20° C., or that is an aprotic solvent having a relative permittivity of 40 or lower at 20° C., and thereby forming a flaky aggregate of the metal oxide colloidal particles in the liquid; and subjecting the flaky aggregate to at least one treatment selected from drying, heating, and pressurization, to increase a binding force between the metal oxide colloidal particles constituting the flaky aggregate, and thereby converting the flaky aggregate into a flaky particle that is insoluble in water.

Advantageous Effects of Invention

With the present invention, a mesoporous particle adapted to be blended with matrix materials can be provided. The mesoporous particle of the present invention has a flaky shape. Accordingly, the mesoporous particle has a large surface area per unit volume, and is excellent for exertion of functions. In addition, the mesoporous particle of the present invention has a single-layer structure, and has a thickness of 0.1 μm to 3 μm. Accordingly, the mesoporous particle is less likely to be deformed or broken when blended with a matrix material, and is adapted to be blended with a thin molded body such as a coating film. Furthermore, the mesoporous particle of the present invention has mesopores with an average pore diameter of 10 nm or more, and is thus suitable for treatments such as adsorption and decomposition of macromolecules such as proteins. In addition, with the production method of the present invention, the mesoporous particle adapted to be blended with matrix materials can be efficiently produced without using a surfactant micelle as a template.

DESCRIPTION OF EMBODIMENTS

Figure 16:
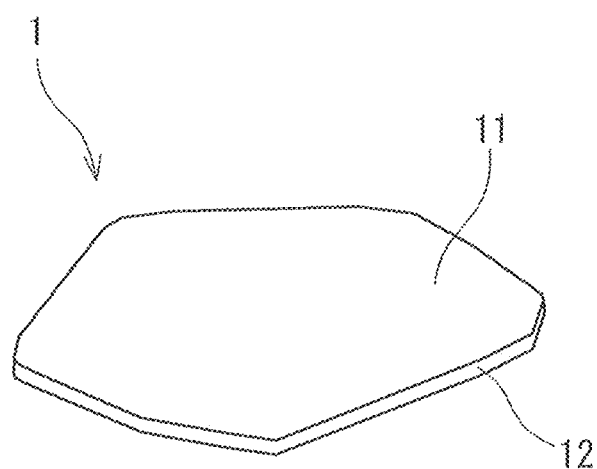
FIG. 16 is a perspective view of an example of a mesoporous particle of the present invention.

Hereinafter, embodiments of the present invention will be described with reference to the drawings. An example of a mesoporous particle 1 of the present invention is shown in FIG. 16. The particle 1 is a single-layer body having a flaky outer shape. The flaky particle 1 has a pair of principal surfaces 11 substantially parallel to each other, and the thickness of the particle 1 is defined by the distance between the principal surfaces 11. In the case of a particle having a multi-layer structure, the side surfaces of the layers and the interlayer portions are exposed on the side surface of the particle. However, a side surface 12 of the single-layer particle 1 does not have such appearance characteristics.

In the present specification, the term "flaky" means the shape of a plate-like body whose principal surfaces can be regarded as flat or curved surfaces and in which the ratio of the average diameter of each principal surface to the thickness is 3 or more. In view of blending of the flaky particle with matrix materials, the appropriate thickness of the flaky particle is 0.1 μm to 3 μm, and the thickness is preferably 0.2 μm to 2 μm. Assuming a circle having an area equal to the area of the principal surface of the flaky particle, the average diameter of the flaky particle corresponds to the diameter of the circle. The average diameter is preferably 1 μm to 1 mm, more preferably 2 μm to 0.5 mm, and particularly preferably 5 μm to 0.3 mm. The ratio of the maximum diameter to the minimum diameter in the principal surface is preferably 1 to 10, and more preferably 1 to 4. The ratio of the average diameter of the principal surface to the thickness is preferably 5 or more, and more preferably 10 or more, and is, for example, 30 or less, and preferably 20 or less. The definitions of the shapes other than the flaky shape (fibrous, spherical, and non-spherical shapes) will be described later.

The particle 1 is a mesoporous body, and is provided with so-called mesopores. The mesopores are pores having a diameter of 2 nm to 50 nm. The mesopores in the particle 1 have an average pore diameter of 10 nm or more, and can take in macromolecules such as proteins. The particle 1 in the present embodiment is composed of metal oxide particles aggregated in such a manner as to form mesopores between the particles. Therefore, the particle 1 has mesopores not only in the side surface 12 but also in the principal surfaces 11. That is, all the surfaces have mesopores. The mesoporous particle 1 having such preferred characteristics can be obtained by the above-described method using a metal oxide sol, more specifically, by the production method of the present invention in which metal oxide colloidal particles are aggregated into a flake.

This method utilizes, as a particle formation mechanism, a phenomenon in which, in the course of interdiffusion between the metal oxide sol and the solvent, the electrical repulsion between the metal oxide colloidal particles decreases to cause aggregation of the colloidal particles. In this formation mechanism, the colloidal particles are aggregated in such a manner as to form mesopores between the particles. Therefore, a mesoporous particle can be obtained without using a template such as a surfactant micelle. Hereinafter, the production method of the present invention suitable for producing the mesoporous particle 1 will be described. When the particle formation mechanism that forms the basis of the production method of the present invention is applied, a particle can be obtained in the form of a fiber, a sphere, or the like by controlling the mode of aggregation of the colloidal particles. Accordingly, not only the conditions for obtaining a flaky particle, but also the conditions for obtaining various shapes of particles are described below.

First, the definitions of the terms will be described. An aggregate formed by aggregation of the metal oxide colloidal particles is soluble in water before being suitably treated. For example, when the aggregate is put into water which is then stirred, the aggregate is dispersed again in the form of metal oxide colloidal particles. However, if the aggregate is subjected to treatment, such as drying and heating, to increase the binding force between the metal oxide colloidal particles, the aggregate becomes insoluble in water. In the present specification, an aggregate that has undergone insolubilization is referred to as a "particle", and an aggregate that has not undergone insolubilization and is soluble in water is referred to as an "aggregate". Therefore, for example, a burned product (sintered product) obtained from an aggregate is categorized as a "particle". Whether or not an aggregate is "insoluble in water" can be determined by whether or not the aggregate is dissolved in 20° C. water when the water is stirred by a generally-used stirring means (e.g., a magnetic stirrer).

In the following description, the values of the "relative permittivity" and the "solubility in water" are values measured at 20° C., unless otherwise specified. The "viscosity coefficient" mentioned later is also based on a value measured at 20° C. As is well known, the unit "g/100 ml" of the solubility in water of a solvent indicates the upper limit of the amount of the solvent soluble in 100 ml of water. In addition, similar to the case of the solubility, whether or not a solvent is miscible with water is determined at 20° C.

In the present specification, the terms used for describing the types of solvents are defined as below. A "protic solvent" is a solvent whose molecular structure has a proton-donating functional group. Examples of the proton-donating functional group include carboxylic acid groups and alcoholic hydroxyl groups. An "aprotic solvent" is a solvent whose molecular structure has no proton-donating functional group.

For a protic solvent, the term "low-permittivity" means that the protic solvent has a relative permittivity of 30 or lower. For an aprotic solvent, the term "low-permittivity" means that the aprotic solvent has a relative permittivity of 40 or lower. The term "high-permittivity" means that the relative permittivity is higher than 30 (protic solvent) or higher than 40 (aprotic solvent). The term "polar" means that the solubility of a solvent in water is 0.05 g/100 ml or more, while the term "non-polar" means that the solubility is less than 0.05 g/100 ml. The term "aqueous" means that a solvent is miscible with water, in other words, means that the solvent has an infinite solubility ($\infty$) in water and can be mixed with water at an arbitrary ratio. The term "non-aqueous" means that the solubility of a solvent in water has a finite value. Accordingly, an "aqueous" organic solvent means a "polar" organic solvent even when no particular mention is made.

A description will be given of the mechanism of formation of an aggregate of metal oxide colloidal particles in the particle formation mechanism on which the production method of the present invention is based.

As is well known, colloidal particles repel each other due to their electric charges, and thus maintain a stable dispersion state in a medium. The lower the permittivity of the dispersion medium (liquid-phase medium in the present invention) present between the colloidal particles is, the smaller the electrical repulsion acting between the colloidal particles is. The present invention utilizes a phenomenon in which colloidal particles are aggregated due to reduction in repulsion associated with decrease in permittivity.

When a metal oxide sol whose dispersion medium is water is fed into a liquid, the liquid phases interdiffuse at the interface between the sol and the liquid having received the sol. In the case where the liquid contains a solvent that can interdiffuse with water, and where the relative permittivity of the solvent is smaller than the relative permittivity of water (about 80), the interdiffusion between the solvent and water reduces the permittivity of the liquid-phase medium present between the metal oxide colloidal particles, and accordingly reduces the electrical repulsion between the colloidal particles. If the cohesive force derived from a universal attracting force acting between the colloidal particles becomes larger than the repulsion as a result of the reduction in the repulsion, the colloidal particles are aggregated. In this case, the colloidal particles are aggregated in a region at which the solvent and water interdiffuse (hereinafter, the region may be referred to as "interface"), and the aggregate of the colloidal particles grows. When the weight of the aggregate exceeds a weight that allows dispersion, the aggregate falls from the interface and settles out.

Depending on the form of aggregation, a new interface is formed at the site from which the aggregate has settled out. In this case, the colloidal particles are further aggregated at the new interface, and settle out. In this manner, aggregates are formed and settle out one after another.

In order to form aggregates of colloidal particles by the above mechanism, a protic solvent having a relative permittivity of 30 or lower, or an aprotic solvent having a relative permittivity of 40 or lower, should be used. A solvent having a relative permittivity higher than the above upper limit cannot provide sufficient reduction in the repulsion between the colloidal particles to cause aggregation of the colloidal particles.

Examples in which a protic solvent is used are described below. When a metal oxide sol whose dispersion medium is water is dropped into ethanol (relative permittivity: 24) or into 2-ethoxyethanol (=ethylene glycol monoethyl ether, relative permittivity: 30), aggregates of colloidal particles are formed. By contrast, when the sol is dropped into methanol (relative permittivity: 33), into ethylene glycol (relative permittivity: 39), or into propylene glycol (relative permittivity: 32), the colloidal particles maintain the dispersion state. Examples in which an aprotic solvent is used are described below. When the metal oxide sol is dropped into acetone (relative permittivity: 21) or into acetonitrile (relative permittivity: 38), aggregates of the colloidal particles are formed. By contrast, when the sol is dropped into dimethyl sulfoxide (relative permittivity: 49), the colloidal particles maintain the dispersion state.

The reason why the upper limit of the relative permittivity of aprotic solvents is higher than the upper limit of the relative permittivity of protic solvents is thought to lie in the fact that the higher the relative permittivity of a protic solvent is, the larger the number of free protons is, and thus the more likely the colloidal particles are to be stabilized by electrical double layers.

A solvent having a sufficiently low relative permittivity but having an extremely low affinity for water cannot interdiffuse with water to reduce the repulsion between the colloidal particles. Accordingly, a solvent having a solubility in water of 0.05 g/100 ml or more should be used. For example, when a metal oxide sol whose dispersion medium is water is dropped into 1-octanol (solubility in water: 0.054 g/100 ml), aggregates of the colloidal particles are formed. By contrast, when the sol is dropped into hexane (solubility in water: 0.001 g/100 ml) which has a sufficiently low relative permittivity of about 2 but which is hardly soluble in water, no aggregates of the colloidal particles are formed. Solvents that are hardly insoluble in water and categorized as non-polar solvents in the present specification, cannot cause aggregation of colloidal particles even if the solvents have a polar functional group. Examples of such non-polar solvents include isopropyl myristate.

As will be described later, the shape of the resultant aggregates is influenced by the solubility in water of a solvent used. When a solvent having a solubility in water of 2 g/100 ml or more is used, the tendency for the aggregates to take the form of spheres, fibers, or flakes is strong, and the industrial utility of the aggregates or particles obtained from the aggregates is increased. By contrast, when a solvent having a solubility in water less than 2 g/100 ml, the aggregates are very likely to take the form of non-spherical agglomerates which are less useful industrially. Therefore, in general, the solubility in water of a solvent used is preferably 2 g/100 ml or more. In the case where colloidal particles should be aggregated into flakes as in the production method of the present invention, a solvent having a sufficiently high solubility in water, that is, a (aqueous) solvent miscible with water, is suitably used. In an embodiment of the present invention, a metal oxide sol starts to be dropped into a liquid at least part of which is an aqueous low-permittivity organic solvent. The proportion of the aqueous low-permittivity organic solvent in the liquid is preferably 50% by weight or more, and more preferably 80% by weight or more.

Generally, in an acidic metal oxide sol, the colloidal particles cannot come close to each other due to the effect of hydration energy, and are in a stable state. Therefore, in the case of using an acidic metal oxide sol, aggregation of the colloidal particles is less likely to be caused by reduction in electrical repulsion associated with interdiffusion. By contrast, in an alkaline metal oxide sol, the influence of hydration energy is small, and the colloidal particles are stabilized by electrical double layers formed on the surfaces of the colloidal particles and represented by -MO-H$^+$ and -MO-R$^+$ (where M is a metal element such as Si, Ti, and Zr, and R is an alkali metal element as typified by Na). Therefore, in the case of using an alkaline metal oxide sol, the repulsion between the colloidal particles can be sufficiently reduced by interdiffusion between a low-permittivity polar solvent and water, to cause aggregation of the colloidal particles. More precisely, the sol whose colloidal particles are aggregated by reduction in the permittivity of the dispersion medium need not be an alkali, and it is sufficient for the sol to have a pH of 7 or higher.

Hereinafter, a description will be given of embodiments of the steps of the production method for aggregating metal oxide particles so as to form mesopores, and obtaining mesoporous particles from the aggregates.

As is well known, a metal oxide sol can be prepared by hydrolyzing a metal alkoxide. Alternatively, a previously-prepared commercially-available product may be used. In either case, a sol having a pH of 7 or higher needs to be prepared. The pH of the sol may be selected as appropriate within a suitable range depending on, for example, the type of the metal oxide. The pH is, for example, 7.5 or higher, and is particularly preferably 8 to 12. For example, the metal oxide colloidal particles of the metal oxide sol are colloidal particles of at least one selected from silicon oxide, titanium oxide, zirconium oxide, aluminum oxide, tantalum oxide, niobium oxide, cerium oxide, and tin oxide.

As described above, the solvent that interdiffuses with water and thus causes aggregation of the colloidal particles is a low-permittivity polar solvent. Since the shape of the resultant particles depends on the type of the low-permittivity polar solvent, the type of the low-permittivity polar solvent should be selected in accordance with the shape of the particles to be formed. The liquid into which a sol is to be fed such as by introducing droplets of the sol, may consist only of a low-permittivity polar solvent. Alternatively, the liquid may contain a solvent whose relative permittivity and/or solubility in water do not satisfy the above conditions. As is clear from Examples described later, it is fully possible to obtain aggregates of colloidal particles even when a sol is continuously fed into a liquid in which the proportion of a low-permittivity polar solvent is about 20% by weight (in other words, even when the proportion of the solvent is decreased below 20% by weight as a result of weight increase associated with the feed of the sol). However, when the proportion of the low-permittivity polar solvent in the liquid into which the sol is fed is low, the proportion of colloidal particles that remain dispersed without being aggregated may increase, leading to reduction in yield. The proportion of the low-permittivity polar solvent in the liquid into which the sol is fed is 15% by weight or more, preferably 20% by weight or more, and particularly preferably 30% by weight or more, and may be 50% by weight or more. It should be understood that the liquid may contain two or more types of low-permittivity polar solvents.

A low-permittivity polar solvent suitable for practical use is a low-permittivity polar organic solvent. The low-permittivity polar organic solvent is preferably an organic solvent categorized as at least one selected from an alcohol, an aldehyde, a carboxylic acid, a carboxylic acid ester, an ether, a ketone, an amine, an amide, a nitrile, a heterocyclic compound, and a halogenated hydrocarbon. For example, 2-ethoxyethanol mentioned above is categorized as an alcohol and also as an ether. Typical examples of the low-permittivity polar organic solvent are those described in EXAMPLES. However, there are many solvents that allow aggregation of colloidal particles, and such solvents are not limited to the solvents described in EXAMPLES.

Feed of a metal oxide sol into a liquid is preferably carried out in such a manner that the sol introduced is present in the form of droplets surrounded by the liquid. For this purpose, the most reliable way is to introduce the sol in the form of droplets, in other words, to drop the sol. In the case where the amount of a sol introduced per unit time needs to be increased from the standpoint of production efficiency, two or more dropping devices may be used to drop the sol into a liquid. In a preferred embodiment of the present invention, a sol is dropped into a liquid held in a container from two or more dropping devices, preferably in a concurrent manner.

Even when a sol is fed into a liquid from an introduction pipe such as a tube, if a stress is applied to the fed sol such as by stirring the liquid, the fed sol can be dispersed in the liquid in the form of droplets. In this case, the inner diameter of the outlet of the introduction pipe should be limited to 5 mm or less, preferably 2 mm or less, and is preferably limited within a range of, for example, 0.1 mm to 1 mm. In a preferred embodiment of the present invention, a sol is fed through an introduction pipe into a liquid while the liquid is stirred, and the sol is dispersed in the liquid in the form of droplets.

In some cases where the amount of a sol fed into a liquid is excessive relative to the amount of the liquid, the colloidal particles are less likely to be aggregated, and the yield of aggregates is reduced. Therefore, the appropriate total amount of a sol fed into a liquid is in a range of 20% by weight or less, preferably 10% by weight or less, and more preferably 5% by weight or less, relative to the amount of the liquid.

Feed of a metal oxide sol into a liquid containing a low-permittivity polar solvent is preferably carried out while the liquid is stirred. This is because the stirring makes it easier for the sol to be dispersed in the form of droplets, and facilitates separation of aggregates of the metal oxide colloidal particles from the interface between water and the solvent. In addition, when introduction of the sol is accompanied by stirring of the solvent, the time during which the droplets are kept surrounded by the liquid phase is increased, compared to when the solvent is not stirred. This leads to increase in the number of the resultant particles having the same shape. For example, the sol is introduced in the form of droplets into the liquid held in a container from above. Alternatively, for example, the sol is introduced into the liquid held in a container through an introduction pipe whose outlet is placed in the liquid, and the sol is dispersed to form droplets. In general, the droplets settle out in the liquid to the bottom of the container while causing formation of aggregates of colloidal particles. Aggregates are also formed from droplets having reached the bottom of the container. However, at the interface surrounding the droplets having reached the bottom, the cycle of formation of an aggregate and formation of a new interface due to falling of the aggregate is less likely to repeatedly occur. In addition, there is a tendency that aggregates formed from droplets being in contact with the bottom of the container have a large thickness. Accordingly, in some cases, bulked aggregates are formed from droplets having reached the bottom even if the droplets cause formation of flaky aggregates before reaching the bottom.

Stirring of the liquid also exerts an influence on the shape of the aggregates. In order to obtain fibrous or flaky particles, aggregation of metal oxide colloidal particles should be facilitated. Accordingly, feed of the metal oxide sol into the liquid is preferably accompanied by stirring of the liquid, especially when a fibrous or flaky shape should be obtained. The stirring of the liquid is preferably performed with a commonly-known stirring device such as a magnetic stirrer, and a stirrer equipped with a stirring blade and a shaft functioning as a rotational axis.

The size of droplets also has an influence on the shape and size of the particles. In general, each droplet preferably has a size of 5 mg to 1000 mg. If the droplets are too small, the size of aggregates is limited. Accordingly, each droplet present in the liquid preferably has a size of 10 mg or more, especially when colloidal particles should be aggregated so as to obtain flaky or fibrous particles. However, if the droplets are too large, the shapes of aggregates may vary widely. Therefore, each droplet preferably has a size of 500 mg or less. Each droplet particularly preferably has a size of 10 mg to 300 mg.

Introduction of droplets may be performed using a commonly-known dropping device such as a dropper and a pipette. For mass production, droplets may be continuously introduced using various dispensers. Commercially-available droppers or pipettes are not suitable for formation of large droplets. Therefore, when a commercially-available dropper or pipette is used, its tip may be processed as appropriate. Droplets may be continuously introduced using any of these dropping devices, or may be introduced from a plurality of dropping devices concurrently.

Aggregates having been formed can be dissolved in water if the aggregates have not undergone any treatment. This is because the binding strength between the metal oxide colloidal particles constituting the aggregates is not sufficiently high. Accordingly, in order to make the aggregates insoluble in water and suitable for various uses, the binding strength between the metal oxide colloidal particles may be increased by subjecting the aggregates to at least one treatment selected from drying, heating, and pressurization. The treatment allows the binding between the metal oxide colloidal particles to proceed irreversibly, thereby converting the aggregates into particles insoluble in water.

Drying is convenient as a treatment for insolubilizing the aggregates. Drying causes xerogelation (hereinafter, simply referred to as "gelatinization") of the aggregates, and thus makes the aggregates insoluble in water. In advance of the drying, the aggregates are separated from the liquid containing the aggregates. Alternatively, the liquid containing the aggregates may be put into storage as it is, and the separation and drying may be carried out when necessary. In this case, it is advantageous that the liquid containing the aggregates be put into storage after the content of the aggregates is increased by carrying out a step of removing part of the liquid containing the formed aggregates in such a manner that the remaining liquid contains the aggregates. Also in the case where, for example, the aggregates are heat-treated, the treatment efficiency can be enhanced by previously increasing the content of the aggregates in the liquid. When the sol is fed into the liquid held in a container, the aggregates having been formed settle out to the bottom of the container to form a white slurry. If the liquid is removed from the upper portion of the container in such a manner that the aggregates remain in the container, the liquid can be separated from the aggregates remaining in the container. The removed liquid may be reused for aggregation of metal oxide colloidal particles.

The removed liquid may be reused as it is for aggregation of colloidal particles. However, if the water content in the liquid is high, colloidal particles may be less prone to aggregation. Therefore, it is advantageous that the liquid be reused after the water content in the liquid is reduced or, preferably, water is removed from the liquid, by a commonly-known solvent regeneration technique such as distillation, dehydration by a separation membrane, and dehydration by freeze concentration.

The insolubilization of the aggregates can also be carried out by heating and/or pressurization. Specifically, the liquid containing the aggregates may be heated and/or pressurized as it is, or heating and/or pressurization may be performed after the liquid is replaced with another solvent (a solvent for heat treatment), so as to allow the binding between the metal oxide colloidal particles to proceed irreversibly.

In this case, the heating temperature is preferably 50° C. or higher, and more preferably 70° C. or higher, for example, 78° C. to 85° C. The heating is carried out at a temperature lower than or equal to the boiling point of the liquid. Therefore, especially when the solvent contained in the liquid has a somewhat low boiling point of 50° C. or lower, it is preferable that the heating be carried out after the liquid is replaced with a solvent for heat treatment having a higher boiling point of, for example, 70° C. or higher. The heating time is not particularly limited, and may be set as appropriate depending on the applied temperature or the like. For example, the heating time is 0.1 hours to 12 hours, and particularly 2 hours to 8 hours. When a liquid containing aggregates was heat-treated at 82° C. for 8 hours, the aggregates were converted into particles. The particles obtained after the treatment were able to maintain their shapes even when they were put into water which was then stirred, whereas the aggregates before the treatment were so weak that the aggregates were broken when they were put into water which was then stirred.

The pressure in pressurization is preferably 0.11 MPa or higher, more preferably 0.12 MPa or higher, and particularly preferably 0.13 MPa or higher, for example, 0.12 MPa to 0.20 MPa. For example, the pressurization can be performed by putting a liquid containing aggregates in a container, and setting the pressure of an atmosphere that is in contact with the liquid at around the values indicated above. The pressurization time is not particularly limited, and may be set as appropriate depending on the applied pressure or the like. For example, the pressurization time is 0.2 hours to 10 hours, and particularly 1 hour to 5 hours. In view of weakness of the aggregates, the pressurization is preferably performed at a static pressure. When a liquid containing aggregates and held in a chamber was subjected to a pressure of 0.15 MPa for 3 hours, the aggregates were converted into particles. The particles obtained after the treatment were able to maintain their shapes even when they were put into water which was then stirred, whereas the aggregates before the treatment were so weak that the aggregates were broken when they were put into water which was then stirred. The heating and pressurization may be carried out simultaneously or sequentially.

Particles obtained through gelatinization of aggregates by drying and through the subsequent burning have excellent mechanical strength. However, particles containing a metal oxide are not necessarily required to have excellent mechanical strength for every kind of use. Depending on the intended use, particles obtained by the heating and/or the pressurization described above may be used without being gelatinized.

In order to obtain metal oxide particles gelatinized by drying, aggregates need to be separated from a liquid containing the aggregates. It is advantageous that the separation step be carried out by solid-liquid separation, and thus the formed aggregates be separated from the liquid. The solid-liquid separation can be performed using a commonly-known technique such as filtration, centrifugation, and decantation. The aggregates separated from the liquid by the separation step may be put into storage as they are, or may be further subjected to the subsequent washing step and then put into storage. As described above, the separated liquid can be reused for aggregation of metal colloidal particles after the water content is reduced as necessary. In a preferred embodiment, the production method of the present invention further includes the step of reusing the liquid separated from the aggregates, or part of a liquid separated from the remaining liquid, as at least part of a liquid for aggregation of colloidal particles.

The separated aggregates are preferably washed in advance of drying, so as to wash away the liquid attached to the aggregates. In the case where a solvent having a boiling point higher than 100° C. is used, it is recommended that the washing step be carried out with a washing agent having a boiling point lower than that of the solvent. However, when the aggregates are washed with water, caution should be exercised because the aggregates may be dissolved. A low-permittivity polar organic solvent, in particular, a low-permittivity polar organic solvent having a low molecular weight and a boiling point lower than 100° C., as typified by ethanol and acetone, is suitable as the washing agent.

After the washing, the aggregates are dried. The conditions for the drying step are not particularly limited, and the drying step may be performed by natural drying (air drying at normal temperature). However, it is advantageous that the drying step be carried out in an atmosphere having a temperature appropriate for the type of the liquid to be removed. For example, the temperature is 40° C. to 250° C., and particularly 50° C. to 200° C. The aggregates are gelatinized by the drying, and thus become insoluble in water.

After the drying, the particles obtained by gelatinization are burned as necessary. The burning can enhance the strength of the particles. The burning is preferably carried out in an atmosphere having a temperature of, for example, 300° C. to 1500° C., particularly 400° C. to 1200° C. That is, in a preferred embodiment, the production method of the present invention further includes the step of burning the particles at a temperature of 300° C. or higher. The burning step may be carried out in continuation to the drying step described above. That is, for example, the aggregates may be dried during a temperature-increasing process for burning of particles, and the particles obtained by the drying may be burned without any interruption.

As described above, the shape of the particles to be formed is influenced by the type of a low-permittivity polar solvent. For example, an aqueous low-permittivity organic solvent is suitably used for forming flaky particles. In a preferred embodiment of the present invention, at least part of the low-permittivity polar solvent used is an aqueous low-permittivity organic solvent (hereinafter, may be referred to as "organic solvent A"), and at least part of the resultant particles are flaky particles. In this case, the proportion of the organic solvent A in the low-permittivity polar organic solvent is preferably 50% by weight or more, more preferably 70% by weight or more, and particularly preferably 90% by weight or more. The use of a solvent containing a high proportion of the organic solvent A allows substantially all (e.g., 95% by weight or more) of the resultant particles to be flaky particles.

Stirring of a liquid into which a metal oxide sol is fed is not essential for formation of flaky particles. However, if the liquid is stirred, an interface at which water and an organic solvent interdiffuse is extended, and colloidal particles are aggregated at the extended interface. Therefore, stirring of the liquid contributes to aggregation of the colloidal particles into flakes.

Spherical and fibrous mesoporous particles can also be obtained by applying the particle formation mechanism employed in the production method of the present invention, and by appropriately selecting a solvent. A non-aqueous low-permittivity polar organic solvent is suitably used for forming spherical particles. When at least part of the low-permittivity polar solvent used is a non-aqueous low-permittivity polar organic solvent (hereinafter, may be referred to as "organic solvent B1"), at least part of the resultant particles are spherical particles. In this case, the proportion of the organic solvent B1 in the low-permittivity organic solvent is preferably 50% by weight or more, more preferably 70% by weight or more, and particularly preferably 90% by weight or more. The use of a solvent containing a high proportion of the organic solvent B1 allows substantially all (e.g., 95% by weight or more) of the resultant particles to be spherical particles. It is advantageous that the organic solvent B1 used be a solvent having a solubility in water of 50 g/100 ml or less, particularly 30 g/100 ml or less, more particularly less than 10 g/100 ml, for example, 2 g/100 ml or more and less than 10 g/100 ml. With this method, it is also possible to mass-produce spherical particles having a particle diameter of 1 μm or more, particularly 5 μm or more, more particularly more than 10 μm, and, in some cases, more than 15 μm.

A liquid containing two or more organic solvents is suitably used for producing fibrous particles. When at least part of the low-permittivity polar solvent is an aqueous low-permittivity polar organic solvent (organic solvent A), and the liquid into which a metal oxide sol is fed contains an organic solvent immiscible with water (hereinafter, may be referred to as "organic solvent B"), at least part of the resultant particles are fibrous particles. The organic solvent B may be a non-aqueous low-permittivity polar organic solvent (organic solvent B1) or may be another non-aqueous organic solvent, for example, a non-aqueous low-permittivity non-polar organic solvent (hereinafter, may be referred to as "organic solvent B2") such as hexane. That is, in the case where fibrous particles are to be produced, the liquid to which the sol is fed may contain the organic solvent A and the organic solvent B1 as low-permittivity polar solvents, or may contain the organic solvent A as a low-permittivity polar solvent and the organic solvent B2 which is not a low-permittivity polar solvent. In addition, in order to obtain fibrous particles, a mixed solvent composed of the organic solvent A, and the organic solvent B1 and/or the organic solvent B2, may be used as the liquid into which the metal oxide sol is fed. In this case, it is advantageous that the organic solvent B1 used be a solvent having a solubility in water of 50 g/100 ml or less, particularly 30 g/100 ml or less.

In many cases, fibrous particles are formed together with blocky particles such as spherical particles, and/or together with flaky particles. In order to increase the proportion of fibrous particles in the particles to be formed, it is desired that the ratio between the organic solvent A and the organic solvent B be adjusted to a preferred range. The appropriate ratio between the organic solvent A and the organic solvent B for production of fibrous particles varies widely depending on, for example, the types of the solvents, and is thus difficult to uniformly specify. The appropriate weight ratio generally ranges from 5:95 to 95:5, and ranges from 10:90 to 90:10 in many cases.

When the ratio of the organic solvent B to the organic solvent A is below the range of ratios that allow formation of fibrous particles, the resultant particles are generally in the form of flakes. In some cases where the ratio of the organic solvent B is below but close to the aforementioned range, flakes on the surfaces of which ridge portions like wrinkles are formed (flakes with wrinkles) are obtained. The formation of these wrinkles is thought to be due to the fact that the presence of the organic solvent B causes local differences in the aggregation rate of the colloidal particles.

In some cases where the ratio of the organic solvent B to the organic solvent A lies in the lower part of the range of ratios that allow formation of fibrous particles, thick fibrous particles are obtained. The formation of such particles is thought to be due to the fact that ridge portions having grown on the edges and surfaces of flaky aggregates are rolled up by the influence of surface tension, and are separated from the aggregates. In some cases, the thick fibrous particles include particles that can be considered to be formed by the aggregates themselves having been rolled up. In many cases, the shape in the longitudinal direction of the thick fibrous particles is distorted because of the formation mechanism. The thick fibrous particles typically have a diameter of 5 μm to 100 μm, and a length of 20 μm 2000 μm.

When the ratio of the organic solvent B to the organic solvent A is within the range that is very appropriate for formation of fibrous particles, thin fibrous particles can be obtained. In some cases, spherical fine particles having been deformed are attached to the tips of the thin fibrous particles. The presence of these fine particles implies that the thin fibrous particles are formed through a mechanism different from the mechanism of the formation of the thick fibrous particles.

The formation of the thin fibrous particles is thought to be due to the fact that fine droplets of the sol are elongated by stirring into filaments in the liquid phase, and the organic solvent A diffuses in the elongated droplets from around the droplets. It is inferred that, when a limited amount of the organic solvent A diffuses in the droplets of the sol, the droplets having increased viscosities are elongated before the colloidal particles are aggregated and grow into such a large size that the aggregate settles out. The fine particles at the tips of the fibrous particles are parts of droplets that have not been elongated due to excessive increase in viscosity. The thin fibrous particles typically have a diameter of 0.5 μm or more and less than 5 μm, and a length of 10 μm to 2000 μm.

Even when a liquid appropriate for formation of fibrous particles is used, if droplets of the sol are introduced into the liquid without stirring of the liquid, only a very limited amount of fibrous particles are formed. In order to obtain fibrous particles, it is preferable that droplets of the metal oxide sol be introduced while the liquid is stirred.

In many cases where the ratio of the organic solvent B to the organic solvent A is beyond the range of ratios that allow formation of fibrous particles, the resultant particles have spherical shapes. The formation of such particles is thought to be due to the fact that the aggregation of colloidal particles is further restricted, and the increase in the viscosity of the sol is made slow, as a result of which the droplets almost completely maintain their shapes without being elongated into filaments. In some cases where the aggregation rate of the colloidal particles is extremely low, non-spherical particles are formed. This may be because the droplets are deformed by contact with the wall of a container, are combined with each other, or are broken in the course of aggregation. The blocky particles such as spherical or non-spherical particles may be solid or hollow.

It is also possible to obtain fibrous particles using one low-permittivity polar organic solvent. The properties that a low-permittivity polar organic solvent suitable for formation of fibrous particles should have vary slightly depending on, for example, the type of the metal oxide sol. In general, low-permittivity polar organic solvents that belong to the following three groups F1 to F3 are considered to be suitable for formation of fibrous particles.

The first group includes low-permittivity polar-protic organic solvents F1 having a solubility in water of 10 g/100 ml to 30 g/100 ml, particularly 10 g/100 ml to 20 g/100 ml. Examples of the solvents F1 include monohydric alcohols having a solubility in water within the above range and having a molecular weight of preferably 50 to 85, particularly preferably 60 to 80. Examples of such alcohols include 2-butanol (solubility in water: 12.5 g/100 ml, molecular weight: 74) and 2-butene-1-ol (16.6 g/100 ml, 72). By contrast, 1-butanol which is a monohydric alcohol but has a slightly low solubility in water (solubility in water: 7.8 g/100 and acetylacetone which has an appropriate solubility in water (16 g/100 ml) but is an aprotic solvent, cannot be suitably used alone as a solvent for formation of fibrous particles.

The second group includes low-permittivity polar organic solvents F2 miscible with water, having a viscosity coefficient of 1.3 mPas to 3 mPas, and having a molecular weight of 100 or more, particularly 100 or more and 200 or less. The solvents F2 are preferably glycol ethers such as diethylene glycol diethyl ether (solubility: co, viscosity coefficient: 1.4 mPas, molecular weight: 162), propylene glycol monopropyl ether, (∞, 2.8 mPas, 118), and ethylene glycol monoisobutyl ether (∞, 2.9 mPas, 118). Particularly, the solvents F2 are monoethers or diethers of ethylene glycol, diethylene glycol, triethylene glycol, propylene glycol, dipropylene glycol, and tripropylene glycol. More particularly, the solvents F2 are monoethers or diethers of these glycols with alkyl groups or alkenyl groups having 1 to 4 carbon atoms (preferably 2 to 4 carbon atoms). By contrast, 2-butoxyethanol (=ethylene glycol monobutyl ether, solubility: ∞, viscosity coefficient: 3.2 mPas, molecular weight: 118) having a higher viscosity coefficient, and 2-ethoxyethanol (=ethylene glycol monoethyl ether, ∞, 2.1 mPas, 90) having a smaller molecular weight, are not suitable as a solvent for formation of fibrous particles.

The third group includes low-permittivity polar organic solvents F3 that do not belong to the groups F1 and F2. The solvents F3 include polyhydric alcohols having a low solubility and a high viscosity coefficient such as 2-ethyl-1,3-hexanediol, and poorly-soluble glycol ethers such as diethylene glycol monohexyl ether.

It is thought that when a solvent belonging to any of the above groups F1 to F3 is used, the conditions appropriate for formation of fibrous particles are satisfied as in the case where a liquid containing the organic solvent A and the organic solvent B is used. Although the detailed reasons for this are not clear, it seems that not only the solubility in water and the relative permittivity, but also the viscosity coefficient and molecular weight of a solvent should be taken into account as part of factors of formation of fibrous particles. There is a possibility that the viscosity coefficient acts as a factor in determining the shape of particles to be formed in association with the degree of influence exerted by the surface tension of droplets of the sol on the shape of the droplets, and that the molecular weight acts as a factor in determining the shape of particles to be formed in association with the rate of diffusion of the solvent into water.

As illustrated above, in order to obtain fibrous particles, the low-permittivity polar solvent is preferably at least one selected from 2-butanol, 2-butene-1-ol, diethylene glycol diethyl ether, propylene glycol monopropyl ether, ethylene glycol monoisobutyl ether, 2-ethyl-1,3-hexanediol, and diethylene glycol monohexyl ether.

In the method of the present invention, the basic shape of particles is determined in the liquid phase. The method of the present invention does not require the step of peeling a film formed by applying a metal oxide sol onto a substrate, and is therefore suitable for producing thin flaky particles. A particularly suitable method for mass production of thin flaky particles is a method using a metal oxide sol previously mixed with an aqueous high-permittivity organic solvent (organic solvent α) that is miscible with water and that is a protic solvent having a relative permittivity higher than 30, or an aprotic solvent having a relative permittivity higher than 40. The organic solvent α mixed with the metal oxide sol is thought to control the inter diffusion between water and an organic solvent at the interface around droplets, and thus to contribute to narrowing the region of the interface in which the permittivity is reduced.

As the aqueous high-permittivity polar organic solvent (organic solvent α), an alcohol having two or more hydroxyl groups and having four or less carbon atoms is used, and a diol or a triol is preferred. Specifically, at least one selected from ethylene glycol (relative permittivity: 39), propylene glycol (relative permittivity: 32), diethylene glycol (relative permittivity: 32), and glycerin (relative permittivity: 47), is preferred as the organic solvent α.

The mixing ratio by weight between the metal oxide sol and the organic solvent α is preferably 95:5 to 50:50, and particularly preferably 90:10 to 70:30.

When the metal oxide sol that further contains the organic solvent α is used, the thickness of flaky particles is reduced, compared to when the organic solvent α is not used. This method is suitable for mass production of flaky particles having a thickness of 0.5 μm or less, particularly 0.4 μm or less, for example, 0.1 μm to 0.4 μm.

Hereinafter, the meanings of the terms about the shapes of particles will be described. The description of the flaky shape has already been given, and is therefore omitted.

In the present specification, the term "fibrous" means the shape of a filament, that is, a long, thin piece. Specifically, the term "fibrous" means the shape of a filament in which the ratio of the length to the diameter is 3 or more. A fibrous particle need not have a uniform diameter in the length direction, and may have a shape with a portion thicker or thinner than the other portions. In this case, the diameter of the fibrous particle is defined as the diameter of the bottom face of a cylinder having a volume equal to the volume of the fibrous particle. In addition, the fibrous particle need not extend straight in its length direction, and may have a shape extending in a curved manner. The diameter of the fibrous particle is preferably 0.5 μm to 100 μm, and more preferably 1 μm to 10 μm. The length of the fibrous particle is preferably 3 μm to 2 mm, and more preferably 10 μm to 500 μm. The ratio of the diameter to the length in the fibrous particle is preferably 5 to 100.

As described above, fibrous particles may have a large diameter or may have a small diameter, depending on different formation mechanisms. In the present specification, fibrous particles each having a diameter of 5 μm to 100 μm are referred to as "thick fibers", while fibrous particles each having a diameter of 0.5 μm to 10 μm, particularly a diameter of 0.5 μm or more and smaller than 5 μm, are referred to as "thin fibers". In EXAMPLES, the thin fibers are simply referred to as "fibers".

In the present specification, the term "blocky" means the shape of an agglomerate that cannot be categorized as a flake or a fiber, and typically means a spherical shape. A blocky particle in which the ratio of the maximum diameter to the minimum diameter ranges from 1 to 1.5 is referred to as a spherical particle, and the other types of blocky particles are referred to as non-spherical particles. The diameter of the spherical particle is preferably 1 μm to 100 μm, and more preferably 5 μm to 50 μm. The ratio of the maximum diameter to the minimum diameter in the spherical particle is preferably 1 to 1.2.

In general, particles obtained by the production method described above each have a maximum dimension of 2 mm or less.

Functional materials may be previously added to the metal oxide sol. Examples of the functional materials include materials that function as at least one selected from a water repellent agent, an antibacterial agent, an ultraviolet absorber, an infrared absorber, a coloring agent, an electric conductor, a heat conductor, a fluorescent material, and a catalyst. Here, the "heat conductor" means a material having a higher heat conductivity than any of the oxides, such as silicon oxide and tin oxide, listed above as constituent oxides of metal oxide colloidal particles. In addition, the term "catalyst" used herein is intended to include photocatalysts. It should be noted that some functional materials may perform a plurality of functions. For example, titanium oxide (titania) is a material functioning as an ultraviolet absorber and a catalyst (photocatalyst), and carbon black is a material functioning as a coloring agent, an electric conductor, and a heat conductor.

Examples of the functional material are listed below.

Water repellent agent: fluoroalkylsilane compounds, alkylsilane compounds, and fluororesins.

Antibacterial agent: silver, copper, silver compounds, copper compounds, zinc compounds, quaternary ammonium salts, and alkyldiaminoethylglycine hydrochloride.

Ultraviolet absorber: titanium oxide, zinc oxide, cerium oxide, iron oxide, cinnamic acid compounds, para-amino benzoic acid compounds, benzophenone compounds, benzotriazole compounds, salicylic acid compounds, phenol triazine compounds, alkyl benzoate compounds, aryl benzoate compounds, cyanoacrylate compounds, dibenzoylmethane compounds, chalcone compounds, and camphor compounds.

Infrared absorber: antimony-doped tin oxide, tin-doped indium oxide, diimmonium compounds, phthalocyanine compounds, benzenedithiol metallic compounds, anthraquinone compounds, and aminothiophenolate metallic compounds.

Coloring agent: microcrystalline cellulose; inorganic white pigments such as titanium dioxide and zinc oxide; inorganic red pigments such as iron oxide (colcothar) and iron titanate; inorganic brown pigments such as γ-iron oxide; inorganic yellow pigments such as yellow iron oxide and ocher; inorganic black pigments such as black iron oxide and carbon black; inorganic purple pigments such as manganese violet and cobalt violet; inorganic green pigments such as chromium oxide, chromium hydroxide, and cobalt titanate; inorganic blue pigments such as ultramarine and Prussian blue; metal powder pigments such as aluminum powder and copper powder; organic pigments such as Red No. 201, Red No. 202, Red No. 204, Red No. 205, Red No. 220, Red No. 226, Red No. 228, Red No. 405, Orange No. 203, Orange No. 204, Yellow No. 205, Yellow No. 401, and Blue No. 404; organic pigments such as zirconium lakes, barium lakes and aluminum lakes of Red No. 3, Red No. 104, Red No. 106, Red No. 227, Red No. 230, Red No. 401, Red No. 505, Orange No. 205, Yellow No. 4, Yellow No. 5, Yellow No. 202, Yellow No. 203, Green No. 3, and Blue No. 1; and natural dyes such as cochineal dye, lac dye, monascus dye, monascus yellow dye, gardenia red dye, gardenia yellow dye, safflower red dye, safflower yellow dye, beet red, turmeric dye, red cabbage dye, chlorophyll, β-carotene, spirulina dye, and cacao dye.

Electric conductor: metals such as copper, gold, and platinum; and metal oxides such as tin oxide, antimony-doped tin oxide, tin-doped indium oxide, metal-doped zinc oxide, and metal-doped titanium oxide.

Heat conductor; metals such as copper, boron nitride, aluminum nitride, silicon nitride, diamond, carbon nanotube, carbon black, and graphite.

Fluorescent material: fluorescein dyes, pyrazine dyes, coumarin dyes, naphthalimide dyes, triazine dyes, oxazine dyes, dioxazine dyes, rhodamine dyes, sulforhodamine dyes, azo compounds, azomethine compounds, stilbene derivatives, oxazole derivatives, benzoxazole dyes, imidazole dyes, pyrene dyes, terbium-activated gadolinium oxide, calcium tungstate fluorescent materials, europium-activated barium chlorofluoride fluorescent materials, and zinc oxide fluorescent materials.

Catalyst: platinum, palladium, rhodium, iridium, ruthenium, iron oxide, gold, metal complexes, titanium oxide, zinc oxide, cadmium sulfide, and tungsten oxide.

When a functional material is added, the resultant particles contain the functional material in addition to a metal oxide. With the present invention, it is also possible to obtain particles that contain a functional material but have a low proportion of the functional material exposed to the outside. Therefore, for example, highly safe products can be provided for uses for which the influence of nanoparticles on the human body should be taken into account. Titania fine particle-containing flaky silica particles obtained by the present invention are useful in the field of cosmetics as a base material for foundations that provides ultraviolet shielding performance while preventing contact between the titania fine particles and the human body.

Metal oxide particles having mesopores with an average pore diameter of 10 nm or more can be obtained by the production method described above. Particles having mesopores with an average pore diameter of 10 nm or more cannot be obtained by drying a metal oxide sol as it is, or by gelatinizing a sol applied onto a substrate, and peeing the resultant gel. Mesopores with a large pore diameter are thought to be formed by metal oxide colloidal particles that are aggregated in a liquid in such a manner that spaces are maintained among the colloidal particles. With the present invention, mesoporous particles containing a metal oxide can be produced even at ordinary temperature and pressure without use of a surfactant. For example, the mesoporous particles are formed by aggregation of particles of at least one metal oxide selected from silicon oxide, titanium oxide, zirconium oxide, aluminum oxide, tantalum oxide, niobium oxide, cerium oxide, and tin oxide.

With the present invention, mesoporous particles having a high porosity can also be produced. With the present invention, it is possible to obtain mesoporous particles having a porosity of 30% or more, preferably 40% or more, more preferably 50% or more, particularly preferably 60% or more, for example, 60% to 80%.

The specific surface area of the mesoporous particles that can be obtained by the present invention is preferably 50 m$^2$/g to 500 m$^2$/g, more preferably 100 m$^2$/g to 300 m$^2$/g, and particularly preferably 150 m$^2$/g to 250 m$^2$/g, for example, 150 m$^2$/g to 200 m$^2$/g. With the conventional production method using a surfactant, pore channels are formed in the resultant mesoporous particles, and the specific surface area of the mesoporous particles is therefore much greater than 500 m$^2$/g. In addition, the pore volume of the mesoporous particles of the present invention is preferably 0.17 cc/g or more, more preferably 0.25 cc/g or more, particularly preferably 0.43 cc/g or more, and especially preferably 0.5 cc/g or more, for example, 0.5 cc/g to 0.9 cc/g. The average pore diameter of the mesoporous particles is preferably 10 nm to 40 nm, more preferably 10 mm to 30 nm, and particularly preferably 15 nm to 25 nm. The mesopores having such a size are suitable for taking in macromolecules such as proteins.

The mesoporous particles of the present invention are useful as a catalyst carrier, a filter material, an absorbing material, a humidity conditioning material, a heat insulating material, a base material for high-performance ultraviolet shielding, a base material for cosmetics, a low dielectric material, or the like. When the mesoporous particles in the form of flakes are used as a base material for a foundation, the foundation can have characteristics, such as having good extensibility, having excellent adhesion to skins, causing less unevenness during use, and having excellent absorbency for sweat and sebum.

In addition, the present invention allows mass production of flaky mesoporous particles having a single-layer structure. As far as the present inventors know, any production methods suitable for mass production of flaky mesoporous particles have not been reported in the past. This is because flaky mesoporous bodies cannot be obtained by a sol-gel method using a surfactant micelle as a template, since in the sol-gel method, a metal oxide surrounds rod-shaped micelles, and the particle grows three-dimensionally.

It is known that mesoporous particles each composed of tabular crystals assembled together are obtained by using a layered silicate as a silica source. However, the porous bodies are generally formed in a shape far from being flaky. Even if the porous bodies are formed in a shape that can be regarded as flaky, the porous bodies do not have a single-layer structure, but have a multi-layer structure. Furthermore, in the multi-layer structure, the mesopores extend along the interlayer portions. By contrast, the present invention makes it possible to obtain flaky mesoporous particles that have a single-layer structure formed by metal oxide colloidal particles aggregated into a flake, that have mesopores formed between the aggregated colloidal particles, and that have high mechanical strength.

The flaky mesoporous particles that can be obtained by the present invention can also be mesoporous bodies internally including various functional materials. For example, the functional materials are materials that function as at least one selected from a water repellent agent, an antibacterial agent, an ultraviolet absorber, an infrared absorber, a coloring agent, an electric conductor, a heat conductor, a fluorescent material, and a catalyst. Depending on the types of functional materials contained inside the mesoporous particles, the mesopores may greatly help the materials perform their functions effectively. The mesoporous particles "internally including" functional materials may contain functional materials exposed on the surfaces of the mesoporous particles, in addition to functional materials contained inside the mesoporous particles.

Examples of such mesoporous particles include a mesoporous particle internally including titanium oxide. The particle is a mesoporous particle which contains the titanium oxide therein and in which the titanium oxide communicates with the outside of the particle via the mesopores. Organic substances contained in the atmosphere outside the particle come into contact with the titanium oxide via the mesopores of the particle. Therefore, for example, decomposition of the organic substances is allowed to proceed effectively by the photocatalytic function exerted by the titanium oxide. Thus, the mesopores contribute to increasing the area of contact between the outside atmosphere and a functional material contained inside the particle, and thus to facilitating the exertion of the function of the functional material.

If a functional material is added to the flaky particle (mesoporous particle) that can be obtained by the present invention, a particle having an improved uniformity of distribution of the functional material can be obtained. In the method of the present invention, metal oxide colloidal particles are aggregated in such a manner that spaces are maintained among the colloidal particles. Therefore, a functional material as typified by titanium oxide is also distributed in the particle in such a manner that spaces are maintained among the distributed portions of the functional material. Accordingly, in the particle, the functional material is less likely to be unevenly distributed, and is distributed more uniformly than in silica particles obtained by peeling a film formed by applying a silica sol onto a substrate. In the particle, projective overlap between distributed portions of the functional material is small. Therefore, for example, titanium oxide can exhibit ultraviolet shielding performance with increased effectiveness. The content of the titanium oxide in the flaky particles that can be obtained by the present invention is preferably 20% by weight to 45% by weight.

In many of the commercially-available metal oxide sols that have a pH of 7 or higher and that can be used in the method of the present invention as a source of metal oxide, cations contained are an alkali metal ion, particularly, sodium ion (Nat). When such a commercially-available product is used, sodium ions are contained in the resultant particles. Typically, the sodium concentration in the particles is only 1% by weight to 2% by weight in terms of oxide content (in terms of $Na_2O$ content). However, the allowable sodium concentration is lower for some particular uses such as use as a material for an electronic device. When it is necessary to meet such requirements, the sodium concentration can be reduced to a certain degree by washing the particles with an acid such as hydrochloric acid. However, the addition of the washing step increases the production cost. Therefore, in the case where the sodium concentration should be low, it is preferable to use a metal oxide sol whose major cation is an ion other than alkali metal ions, such as ammonium ion ($NH_4^+$). As used herein, the term "major cation" means a cation whose content by weight is the largest. In a preferred embodiment of the production method of the present invention, the metal oxide sol contains an ion other than alkali metal ions as the major cation.

If a metal oxide sol whose major cation is an ion other than alkali metal ions is used, the sodium concentration in terms of $Na_2O$ content in the particles can be reduced to less than or equal to 0.7% by weight, even less than 0.5% by weight, and particularly less than 0.3% by weight. However, since even such a sol generally contains a slight amount of sodium ion, it is difficult to completely prevent sodium from being contained in the particles. For example, the sodium concentration in the particles is 0.001% by weight to 0.7% by weight in terms of oxide content (in terms of $Na_2O$ content).

When the method of the present invention is carried out using metal oxide colloidal particles contained in a metal oxide sol whose major cation is an ion other than alkali metal ions, it is observed that there is a tendency that the metal oxide colloids are less prone to aggregation, and the yield of aggregates is lower than when a metal oxide sol whose cation is an alkali metal ion is used. In order to compensate for this tendency, it is advantageous to facilitate aggregation of metal oxide colloids by previously adding the same cation as the major cation contained in a metal oxide sol used, to a liquid into which the sol is to be fed. In the case where the major cation is ammonium ion, dissolving ammonium ion previously in the liquid increases the yield of aggregates. In this case, the concentration of the "major cation" in the liquid is preferably 0.01% by weight or more, and more preferably 0.02% by weight or more, for example, 0.05% by weight to 3% by weight.

Another method for facilitating aggregation of a metal oxide sol whose major cation is an ion other than alkali metal ions is to add, to the sol, metal oxide colloidal particles that have a stronger cohesive force than metal oxide colloidal particles contained in the sol. The cohesive force of colloidal particles can be evaluated by the Hamaker constant. From this standpoint, metal oxide colloidal particles suitable for facilitating aggregation of a silica sol (silicon oxide sol) are titanium oxide colloidal particles and tin oxide colloidal particles, and are particularly tin oxide colloidal particles. In a preferred embodiment of the production method of the present invention, the metal oxide sol contains silicon oxide colloidal particles, and also contains at least one selected from titanium oxide colloidal particles and tin oxide colloidal particles.

EXAMPLES

Example 1

An amount of 50 ml of each of the organic solvents listed in Table 1 was put in a beaker, and a total amount of 1 g of an alkaline silica sol ("SILICADOL 30S" manufactured by Nippon Chemical Industrial Co., Ltd.) was added in drops of 0.01 g each to the organic solvent. The SILICADOL 30S is a colloidal silica whose dispersion medium is water and which has a pH of 9.0 to 10.5, and contains colloidal particles having a particle diameter of 7 nm to 10 nm. During the dropping of the alkaline silica sol, the organic solvent was stirred with a magnetic stirrer (rotational speed: 800 rpm).

Next, aggregates of colloidal particles were separated by centrifugation from the solvent in which the colloidal particles had been aggregated to form a slurry. The aggregates were washed with 2-propanol, and then 2-propanol was removed by decantation. The obtained aggregates of the colloidal particles were dried in a vacuum dryer set at 150° C. to obtain a silica powder (an assemblage of silica particles). Finally, the dried silica powder was burned at 700° C. for 5 hours. The weight of the obtained powder was about 0.2 g to 0.25 g. The shapes of the burned silica particles were observed, and categorized into a flaky shape, a blocky shape (a spherical or non-spherical shape), and a fibrous shape (thick fibers or thin fibers, thin fibers are simply described as "fibers"), based on the shape categorization described above. The results are shown in Table 1.

In all of the tables provided below, the unit of the solubility is g/100 ml. The values of the relative permittivity, the solubility, and the viscosity coefficient are values measured at 20° C. Furthermore, in the boxes of "Shape of particles", the shapes are listed in descending order of the number of formed particles.

TABLE 1

| No | Organic solvent | Type | Relative permittivity | Solubility in water | Shape of particles |
|---|---|---|---|---|---|
| C0 | Aminoethanol | Polar protic solvent | 38 | ∞ | (NA) |
| C1 | Methanol | | 33 | ∞ | (NA) |
| 1 | Ethanol | | 24 | ∞ | Flakes |
| 2 | 1-propanol (n-propyl alcohol) | | 22 | ∞ | Flakes |
| 3 | 2-propanol (isopropyl alcohol) | | 18 | ∞ | Flakes |
| 4 | 1-butanol (n-butyl alcohol) | | 17 | 7.8 | Spheres, Non-spheres |
| 5 | 2-butanol (sec-butyl alcohol) | | 16 | 12.5 | Fibers, spheres, flakes |
| 6 | 2-methyl-1-propanol (isobutyl alcohol) | | 18 | 8.5 | Spheres, Non-spheres |
| 7 | 2-methyl-2-propanol (tert-butyl alcohol) | | 11 | ∞ | Flakes |
| 8 | 1-pentanol (n-amyl alcohol) | | 14 | 2.4 | Spheres, Non-spheres |
| 9 | 3-methyl-1-butanol (isopentyl alcohol) | | 15 | 2.4 | Spheres, Non-spheres |
| 10 | 3-methyl-2-butanol (tert-pentyl alcohol) | | 6 | 2.4 | Spheres, Non-spheres |
| 11 | 1-hexanol (n-hexyl alcohol) | | 13 | 0.6 | Non-spheres |
| 12 | 1-octanol (n-octyl alcohol) | | 10 | 0.054 | Non-spheres |
| 13 | Benzyl alcohol | | 13 | 3.8 | Spheres |
| 14 | 2-propene-1-ol (allyl alcohol) | | 22 | ∞ | Flakes |
| 15 | Ethylene glycol monoethyl ether (2-ethoxyethanol) | | 30 | ∞ | Flakes |
| 16 | Ethylene glycol monomethyl ether (2-methoxyethanol) | | 17 | ∞ | Flakes |
| 17 | Ethylene glycol mono-n-butyl ether (2-butoxyethanol) | | 10 | ∞ | Flakes |
| 18 | Acetic acid (glacial acetic acid) | | 6.2 | ∞ | Flakes |
| C2 | Formamide | Polar aprotic solvent | 111 | ∞ | (NA) |
| C3 | Dimethyl sulfoxide | | 49 | ∞ | (NA) |
| 19 | Acetonitrile | | 38 | ∞ | Flakes |
| 20 | Acetone | | 21 | ∞ | Flakes |
| 21 | Ethyl acetoacetate | | 16 | 12 | Spheres, Flakes |
| 22 | Pyridine | | 12 | ∞ | Flakes |
| 23 | 2-metylpyridine (2-picoline) | | 9.5 | ∞ | Flakes |
| 24 | Ethylene glycol monomethyl ether acetate | | 8.3 | ∞ | Flakes |
| 25 | Tetrahydrofuran | | 7.6 | ∞ | Flakes |
| 26 | Morpholine | | 7.4 | ∞ | Flakes |
| 27 | Ethylene glycol dimethyl ether | | 5.5 | ∞ | Flakes |
| 28 | 1,4-dioxane | | 2.2 | ∞ | Flakes |
| C4 | n-hexane | | 1.9 | 0.001 | (NA) |

Figure 1:
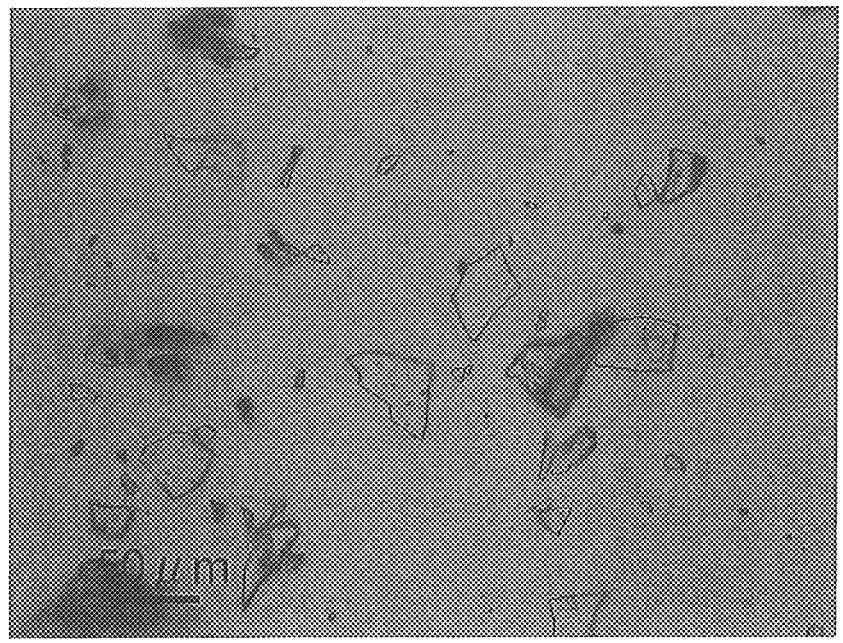
FIG. 1 shows flaky silica particles obtained from No. 3 (organic solvent: 2-propanol, see Table 1) of Example 1, as observed with an optical microscope.
Figure 2:
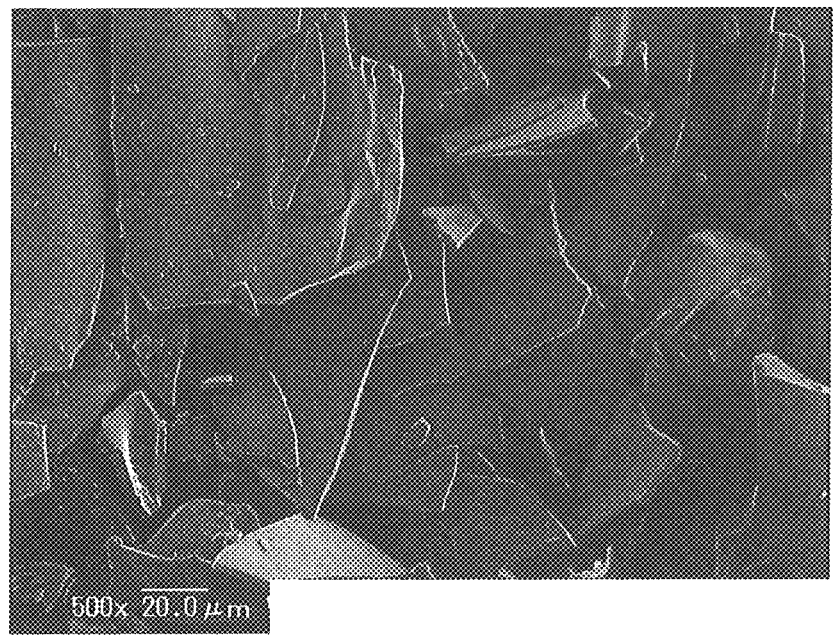
FIG. 2 shows flaky silica particles obtained from No. 3 (organic solvent: 2-propanol, see Table 1) of Example 1, as observed with a scanning electron microscope (SEM).
Figure 4:
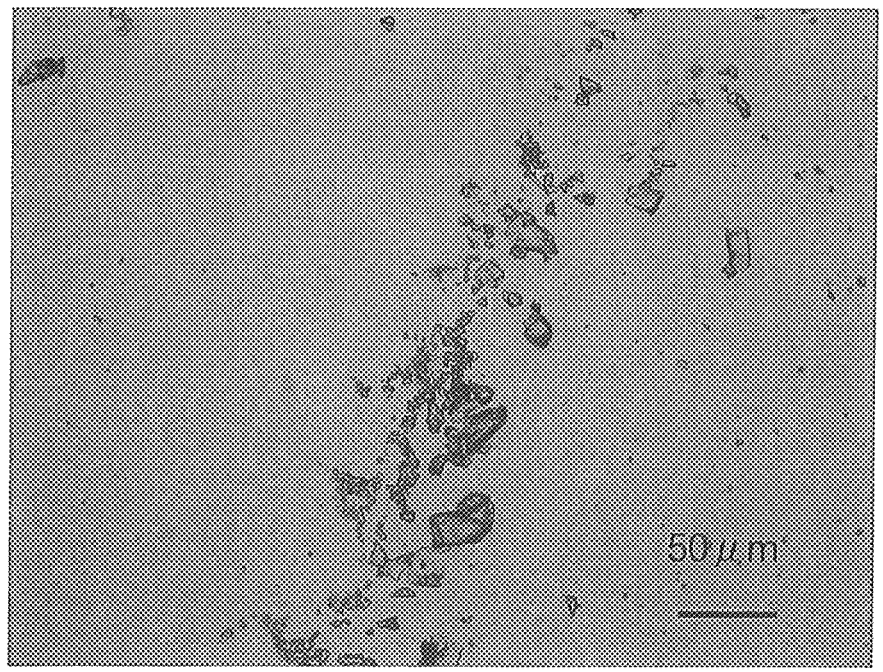
FIG. 4 shows non-spherical silica particles obtained from No. 12 (organic solvent: 1-octanol, see Table 1) of Example 1, as observed with an optical microscope.

C0 to C4 are comparative examples, and n-hexane of C4 is a non-polar solvent.
Observation results of the powder obtained from No. 3 (2-propanol) are shown in FIGS. 1 and 2, and an observation result of the powder obtained from No. 12 (1-octanol) is shown in FIG. 4.
NA: Not aggregated Polar protic solvents having a relative permittivity higher than 30 and polar aprotic solvents having a relative permittivity higher than 40 cannot sufficiently reduce electrical repulsion between colloidal particles. Therefore, when a metal oxide sol was dropped into a solvent that falls under the category of these types of solvents, the colloidal particles maintained the dispersion state. In addition, n-hexane which has a solubility in water less than 0.05 g/100 ml is a low-permittivity solvent, but does not fall under the category of polar solvents. Accordingly, n-hexane cannot cause aggregation of colloidal particles. By contrast, when a low-permittivity polar solvent was used, colloidal particles were aggregated. Specifically, when an aqueous low-permittivity polar organic solvent was used, only flaky particles were obtained. On the other hand, when a non-aqueous low-permittivity polar organic solvent was used, various shapes of particles were obtained. It is noticeable that the number of fibrous particles was the largest among particles obtained by using 2-butanol. When a non-aqueous low-permittivity polar organic solvent having a solubility in water less than 2 g/100 ml was used, only non-spherical particles were obtained.

Figure 3:
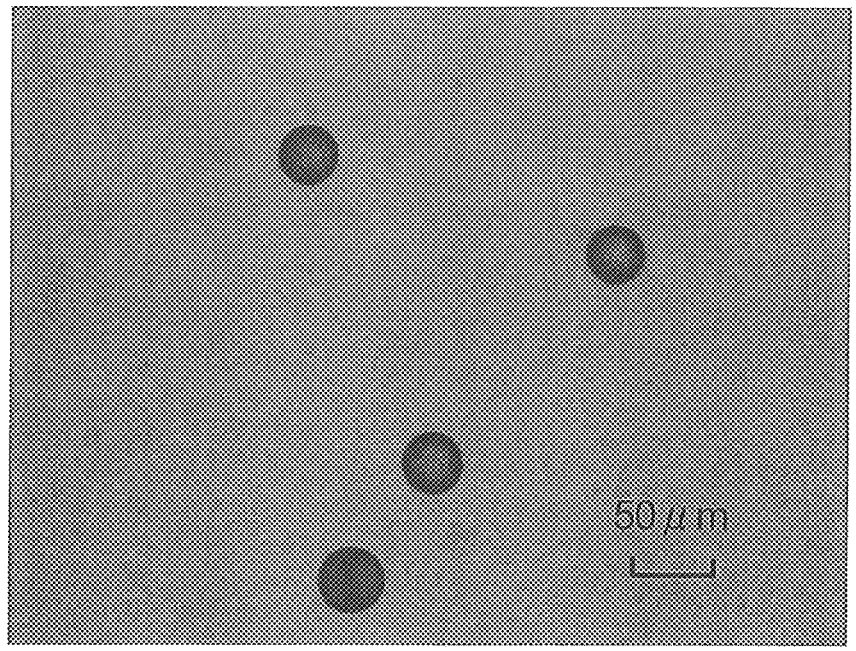
FIG. 3 shows spherical silica particles obtained using 2-phenoxyethanol as an organic solvent in Example 1, as observed with an optical microscope.

Further experiments were performed in the same manner as described above, except that other types of organic solvents were used. It was confirmed that results similar to the above results can be obtained also when the other types of solvents are used. For example, when any of ethylene glycol monophenyl ether (2-phenoxyethanol), 1,5-pentanediol, N-methyl-2-pyrrolidone, and 1,3-dioxolane which are low-permittivity polar solvents was used, aggregation of colloidal particles was observed. The shapes of particles also showed a tendency similar to the above. When 2-phenoxyethanol having a low solubility in water (2.5 g/100 ml) was used, spherical particles were obtained (see FIG. 3; spherical particles having a particle diameter larger than 15 μm), whereas when any of the other three solvents having a high solubility in water was used, flaky particles were obtained. On the other hand, when isopropyl myristate which is a non-polar solvent was used, colloidal particles were not aggregated.

Example 2

An amount of 50 ml of 2-propanol (isopropyl alcohol) was put in a beaker, and a total amount of 1 g of each of the silica sols (colloidal silicas) listed in Table 2 was added in drops of 0.01 g each to the 2-propanol. During the dropping of the silica sol, the 2-propanol was stirred with a magnetic stirrer (rotational speed: 800 rpm). Thereafter, the same steps as in Example 1 were performed to obtain a silica powder. The results are shown in Table 2.

TABLE 2

| No | Metal oxide sol (Colloidal silica) | pH | Colloidal particle diameter (nm) | Shape of particles |
|---|---|---|---|---|
| C30 | SNOWTEX-O | 2 to 4 | 10 to 20 | (NA) |
| C31 | SNOWTEX-OL | 2 to 4 | 40 to 50 | (NA) |
| 31 | SNOWTEX-XS | 9.0 to 10.0 | 4 to 6 | Flakes |
| 32 | SNOWTEX-20 | 9.5 to 10.0 | 10 to 20 | Flakes |
| 33 | SNOWTEX-20L | 9.5 to 11.0 | 40 to 50 | Flakes |
| 34 | SNOWTEX-30 | 9.5 to 10.5 | 10 to 20 | Flakes |
| 35 | SNOWTEX-N | 9.0 to 10.0 | 10 to 20 | Flakes (see the footnotes) |
| 36 | SNOWTEX-UP | 9.0 to 10.5 | 40 to 100 (chain-like particles) | Flakes |
| C32 | SNOWTEX-OUP | 2 to 4 | 40 to 100 (chain-like particles) | (NA) |

TABLE 2-continued

| No | Metal oxide sol (Colloidal silica) | pH | Colloidal particle diameter (nm) | Shape of particles |
|---|---|---|---|---|
| 37 | SNOWTEX-C | 8.5 to 9.0 | 10 to 20 | Flakes |
| 38 | SNOWTEX-S | 9.5 to 10.5 | 8 to 11 | Flakes |
| 39 | SILICADOL 20 | 9.5 to 10.5 | 10 to 20 | Flakes |

C30 to C32 are comparative examples.
All of the "SNOWTEX" series are manufactured by Nissan Chemical Industries, Ltd., and "SILICADOL 20S" is manufactured by Nippon Chemical Industrial Co., Ltd.
In the case of the sample No. 35 for which "SNOWTEX-N" was used, more colloidal particles remained dispersed than in the case of the other samples.

Hydration energy makes a large contribution to the stabilization of an acidic silica sol, unlike in the case of an alkaline silica sol. Therefore, when an acidic silica sol was dropped into a low-permittivity polar organic solvent, the colloidal particles maintained the dispersion state. When an alkaline silica sol is used, the colloidal particles are aggregated even if the colloidal particles in the sol have a very small particle diameter or are dispersed in the state of being connected in a chain.

When "SNOWTEX-N" was used, the yield of aggregates of the colloidal particles was lower than when any of the other alkaline sols was used. This is because the major cation contained in the sol is ammonium ion ($NH_4^+$), while the major cation contained in the other sols is sodium ion ($Na^+$). In the case of using a sol containing a low ion-intensity alkali component such as ammonium ion, aggregation of the colloidal particles can be facilitated by previously adding the ion to a liquid into which the sol is to be dropped. When ammonia was previously added to 2-propanol, the degree of aggregation of the colloidal particles was increased even when "SNOWTEX-N" was dropped. Generally, in the case of dropping an alkaline metal oxide sol in which the content of ammonium ion is larger than that of alkali metal ions, ammonium ion is preferably added in advance to a liquid into which the sol is to be dropped. An example of measurement of the sodium ion concentration in particles obtained from a metal oxide sol whose major cation is ammonium ion will be described later (Example 12).

Example 3

Silica powders were obtained in the same manner as in Example 1, except that organic solvents (low-permittivity polar organic solvents) listed in Table 3 were used. The relative permittivities of all the solvents in Table 3 are 30 or lower. The results are shown in Table 3.

TABLE 3

| No | Low-permittivity polar organic solvent | Solubility in water | Viscosity coefficient (mPas) | Molecular weight | Shape of particles |
|---|---|---|---|---|---|
| 5 | 2-butanol (sec-butyl alcohol) F1 | 12.5 | 4.2 | 74 | Fibers, spheres, flakes |
| 41 | 2-butene-1-ol (crotyl alcohol) F1 | 16.6 | — | 72 | Fibers, spheres, flakes |
| 42 | Diethylene glycol diethyl ether F2 | ∞ | 1.4 | 162 | Flakes, thick fibers |
| 43 | Propylene glycol monopropyl ether F2 | ∞ | 2.8 | 118 | Thick fibers, flakes, spheres |
| 44 | Ethylene glycol monoisobutyl ether F2 (2-isobutoxyethanol) | ∞ | 2.9 | 118 | Fibers, flakes, spheres |
| 45 | 2-ethyl-1,3-hexanediol F3 | 4.2 | 323 | 146 | Spheres, fibers |
| 46 | Diethylene glycol monohexyl ether F3 (2-(2-hexyloxyethoxy)ethanol) | 1.7 | 8.6 | 145 | Fibers, flakes, spheres |

In the samples No. 41-46, part of the particles were in the form of fibers as in the sample No. 5. The solvents belong to any one of the above groups F1 to F3, and have the properties suitable for forming fibers. By contrast, as shown in Table 1, fibrous particles were not obtained by using 1-butanol having a lower solubility in water (7.8 g/100 ml) than the solvents of the group F1, 2-butoxyethanol having a higher viscosity coefficient (3.2 mPas) than the solvents of the group F2, or 2-ethoxyethanol having a smaller molecular weight (90) than the solvents of the group F2.

In order to obtain flaky particles, an aqueous low-permittivity organic solvent is preferably used. However, as shown in Table 3, there are also non-aqueous low-permittivity organic solvents that allow part of the resultant particles to take the form of flakes, such as solvents belonging to the categories F1 and F2.

Example 4

Silica powders were obtained in the same manner as in Example 1, except that mixed solvents of aqueous low-permittivity organic solvents (organic solvents A) and non-aqueous low-permittivity organic solvents (non-aqueous low-permittivity polar organic solvents (organic solvents B1) or non-aqueous low-permittivity non-polar organic solvents (organic solvent B2)) were used. The organic solvents A, B1, and B2 are listed in Tables 5 to 19. The solubilities in water and the viscosity coefficients of the organic solvents B1 used are shown in Table 4. As the organic solvents B2, n-hexane (relative permittivity: 1.89) and n-heptane (relative permittivity: 1.94) were used. The relative permittivities of all of the organic solvents A and the organic solvents B1 which were used were 30 or lower. The results are shown in Table 5 and the subsequent tables.

TABLE 4

| Organic solvent B1 | Solubility in water | Viscosity coefficient (mPas) |
|---|---|---|
| 2-phenoxyethanol | 2.5 | 30.5 |
| Methyl ethyl ketone | 22.6 | 0.42 |
| Acetylacetone | 16 | <1 |
| Cyclohexanone | 8.7 | <2.2 |
| 1-butanol | 7.8 | 3.0 |
| Benzyl alcohol | 3.8 | <7.8 |
| 2-butoxyethyl acetate | 1.1 | 1.8 |
| 2-ethyl-1-hexanol | 0.07 | 9.8 |

TABLE 5

| No. | Organic solvent A 2-ethoxyethanol (% by weight) | Organic solvent B1 2-phenoxyethanol (% by weight) | Shape of particles |
|---|---|---|---|
| 51 | 83.3 | 16.7 | Flakes |
| 52 | 66.7 | 33.3 | Flakes |
| 53 | 50.0 | 50.0 | Flakes |
| 54 | 33.3 | 66.7 | Flakes (with many wrinkles) |
| 55 | 16.7 | 83.3 | Fibers, spheres |

TABLE 6

| No. | Organic solvent A 2-butoxyethanol (% by weight) | Organic solvent B1 2-phenoxyethanol (% by weight) | Shape of particles |
|---|---|---|---|
| 61 | 70.0 | 30.0 | Flakes, fibers, spheres |
| 62 | 60.0 | 40.0 | Flakes, fibers, spheres |
| 63 | 50.0 | 50.0 | Fibers, flakes, spheres |
| 64 | 40.0 | 60.0 | Spheres, flakes, fibers |
| 65 | 30.0 | 70.0 | Spheres (flakes, fibers) |

Figure 5:
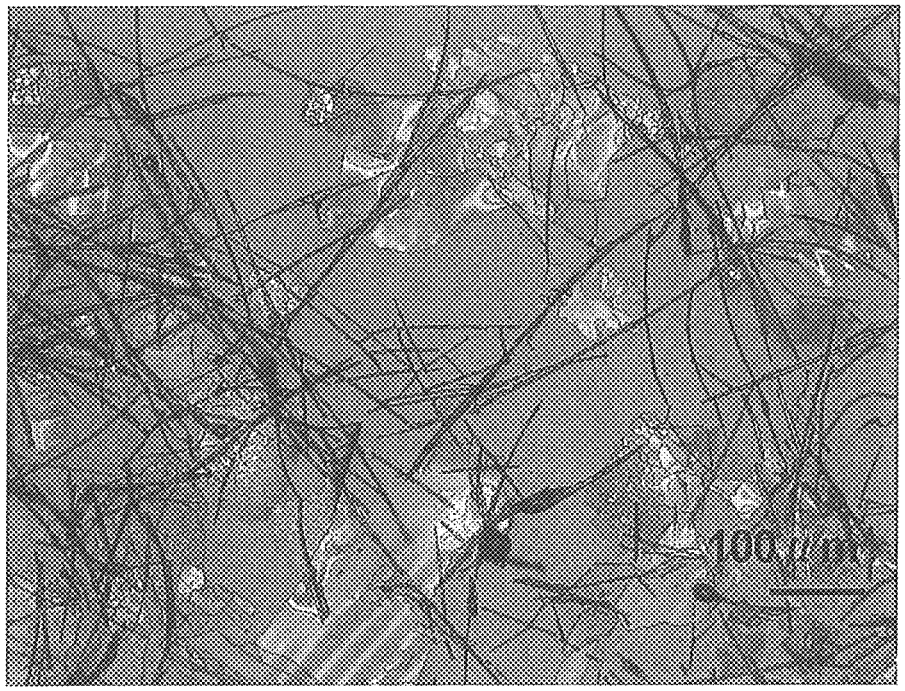
FIG. 5 shows flaky, fibrous, and spherical silica particles obtained from No. 61 (organic solvent: 2-butoxyethanol 70+2-phenoxyethanol 30, see Table 6) of Example 4, as observed with an optical microscope.
Figure 6:
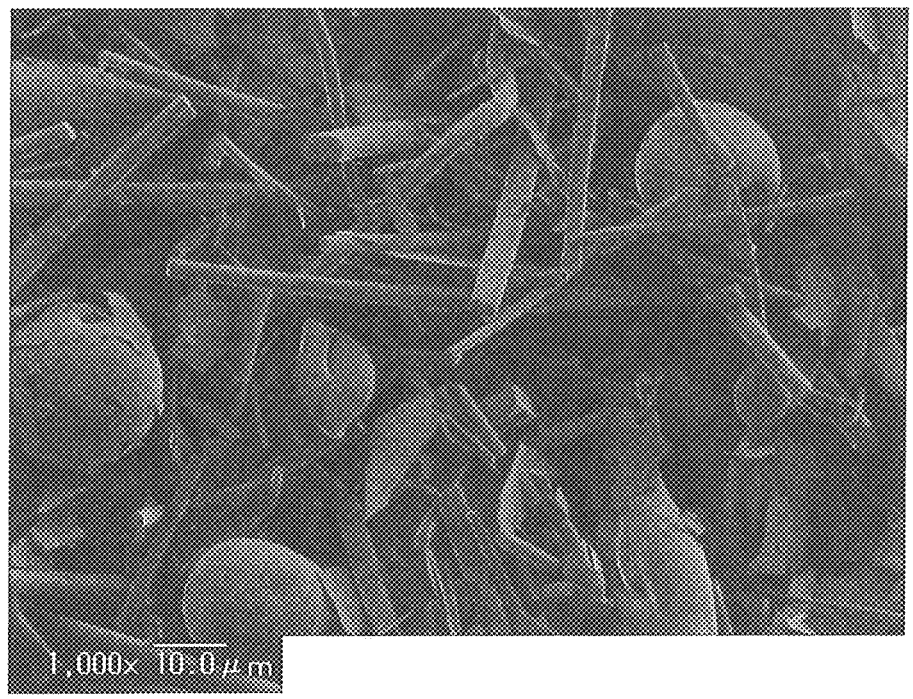
FIG. 6 shows flaky, fibrous, and spherical silica particles obtained from No. 61 (organic solvent: 2-butoxyethanol 70+2-phenoxyethanol 30, see Table 6) of Example 4, as observed with a SEM.
Figure 7:
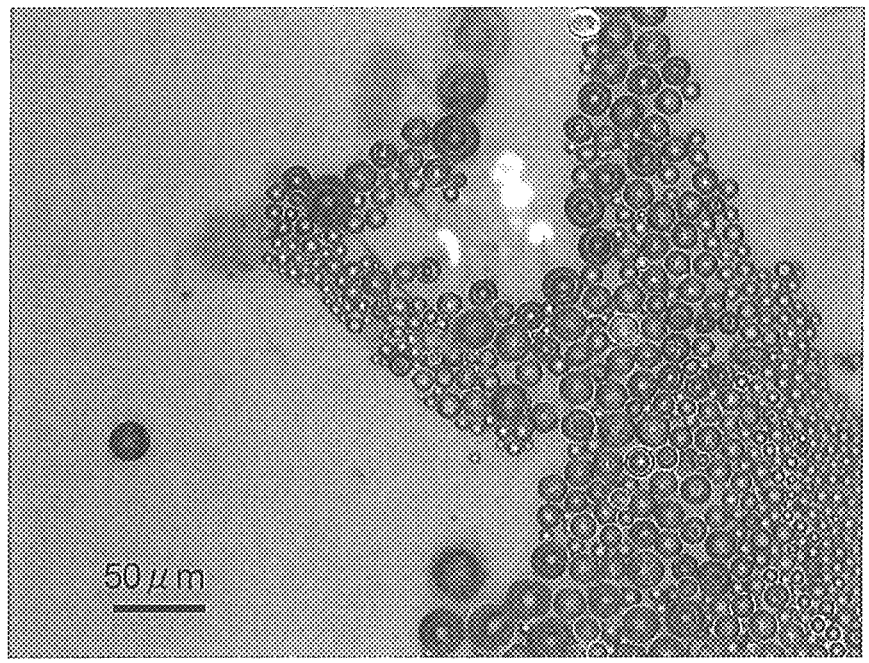
FIG. 7 shows spherical silica particles obtained from No. 65 (organic solvent: 2-butoxyethanol 30+2-phenoxyethanol 70, see Table 6) of Example 4, as observed with an optical microscope.

The amount of the particles observed to have the shapes parenthesized in No. 65 was small. Observation results of the powder obtained from No. 61 are shown in FIGS. 5 and 6, and an observation result of the powder obtained from No. 65 is shown in FIG. 7.

TABLE 7

| | Organic solvent A | | Organic solvent B1 | |
|---|---|---|---|---|
| No. | 2-butoxyethanol (% by weight) | 2-ethoxyethanol (% by weight) | 2-phenoxyethanol (% by weight) | Shape of particles |
| 71 | 42.9 | 42.9 | 14.3 | Flakes |
| 72 | 33.3 | 33.3 | 33.3 | Flakes |
| 73 | 37.5 | 25.0 | 37.5 | Flakes |
| 74 | 40.0 | 20.0 | 40.0 | Flakes |
| 75 | 14.3 | 42.9 | 42.9 | Flakes |
| 76 | 42.9 | 14.3 | 42.9 | Fibers, flakes |
| 77 | 45.5 | 9.1 | 45.5 | Fibers, flakes |
| 78 | 47.6 | 4.8 | 47.6 | Fibers, flakes |

Figure 8:
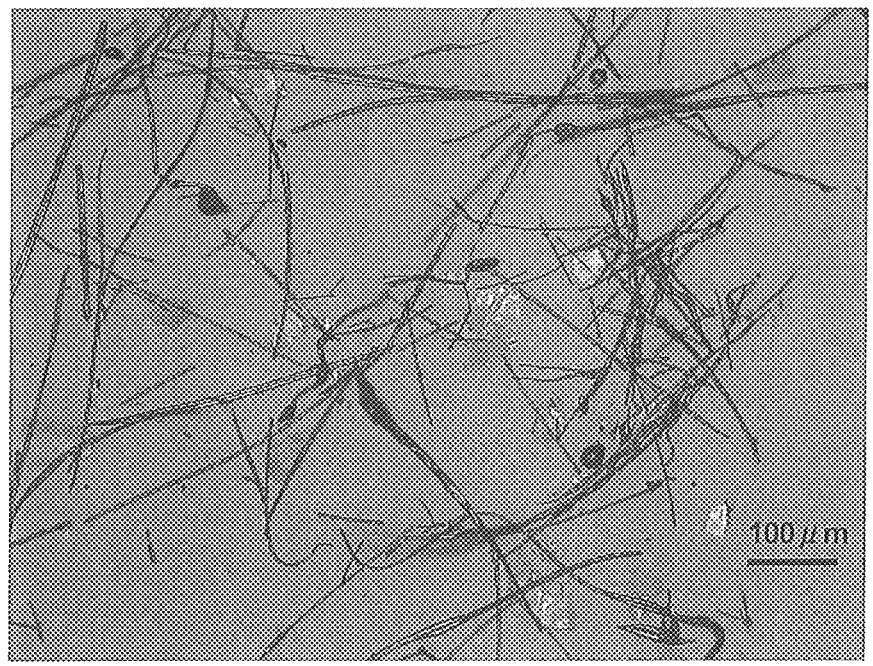
FIG. 8 shows fibrous and flaky silica particles obtained from No. 77 (organic solvent: 2-butoxyethanol 45.5+2-ethoxyethanol 9.1+2-phenoxyethanol 45.5, see Table 7) of Example 4, as observed with an optical microscope.

An observation result of the powder obtained from No. 77 is shown in FIG. 8.

TABLE 8

| No. | Organic solvent A 2-butoxyethanol (% by weight) | Organic solvent B1 1-butanol (% by weight) | Shape of particles |
|---|---|---|---|
| 81 | 50.0 | 50.0 | Fibers, spheres, flakes |

TABLE 9

| No. | Organic solvent A 2-butyl carbitol (% by weight) | Organic solvent B1 1-phenoxyethanol (% by weight) | Shape of particles |
|---|---|---|---|
| 91 | 50.0 | 50.0 | Fibers, spheres, flakes |

TABLE 10

| | | Organic solvent B1 | | |
|---|---|---|---|---|
| No. | Organic solvent A 2-butoxyethanol (% by weight) | 1-phenoxy-ethanol (% by weight) | 2-butoxyethyl acetate (% by weight) | Shape of particles |
| 101 | 63.6 | 27.3 | 9.1 | Fibers, flakes, spheres |

TABLE 11

| No. | Organic solvent A 2-propanol (% by weight) | Organic solvent B1 2-ethyl-1-hexanol (% by weight) | Shape of particles |
|---|---|---|---|
| 111 | 80.0 | 20.0 | Flakes |
| 112 | 70.0 | 30.0 | Flakes (with many wrinkles) |
| 113 | 65.0 | 35.0 | Flakes (with many wrinkles), thick fibers |
| 114 | 60.0 | 40.0 | Thick fibers |
| 115 | 55.0 | 45.0 | Fibers, (deformed) spheres |
| 116 | 50.0 | 50.0 | Spheres, fibers |
| 117 | 45.0 | 55.0 | Spheres, fibers |
| 118 | 40.0 | 60.0 | Spheres |
| 119 | 20.0 | 80.0 | Spheres |

TABLE 12

| No. | Organic solvent A 2-propanol (% by weight) | Organic solvent B1 1-butanol (% by weight) | Shape of particles |
|---|---|---|---|
| 121 | 50.0 | 50.0 | Flakes |
| 122 | 40.0 | 60.0 | Flakes (including flakes with many wrinkles), thick fibers |
| 123 | 35.0 | 65.0 | Fibers, (deformed) spheres, flakes |
| 124 | 30.0 | 70.0 | Fibers, (deformed) spheres, flakes |
| 125 | 25.0 | 75.0 | Fibers, (deformed) spheres, flakes |
| 126 | 20.0 | 80.0 | Spheres, fibers, flakes |
| 127 | 10.0 | 90.0 | Spheres |

TABLE 13

| No. | Organic solvent A 2-propanol (% by weight) | Organic solvent B1 Acetylacetone (% by weight) | Shape of particles |
|---|---|---|---|
| 131 | 50.0 | 50.0 | Flakes |
| 132 | 40.0 | 60.0 | Flakes (with many wrinkles), thick fibers |
| 133 | 30.0 | 70.0 | Thick fibers, flakes (with many wrinkles) |
| 134 | 20.0 | 80.0 | Fibers, (deformed) spheres |

TABLE 14

| No. | Organic solvent A 2-propanol (% by weight) | Organic solvent B1 Benzyl alcohol (% by weight) | Shape of particles |
|---|---|---|---|
| 141 | 70.0 | 30.0 | Flakes |
| 142 | 50.0 | 50.0 | Flakes |
| 143 | 45.0 | 55.0 | Flakes (including flakes with many wrinkles), thick fibers |
| 144 | 40.0 | 60.0 | Thick fibers, flakes (including flakes with many wrinkles) |
| 145 | 35.0 | 65.0 | Fibers, (deformed) spheres |
| 146 | 30.0 | 70.0 | Fibers, spheres |
| 147 | 20.0 | 80.0 | Spheres |

TABLE 15

| No. | Organic solvent A Acetone (% by weight) | Organic solvent B1 Methyl ethyl ketone (% by weight) | Shape of particles |
|---|---|---|---|
| 151 | 50.0 | 50.0 | Flakes |
| 152 | 40.0 | 60.0 | Flakes |
| 153 | 30.0 | 70.0 | Flakes (including flakes with many wrinkles) |
| 154 | 20.0 | 80.0 | Flakes (including flakes with many wrinkles) |
| 155 | 17.0 | 83.0 | Thick fibers, flakes (including flakes with many wrinkles) |
| 156 | 15.0 | 85.0 | Thick fibers, flakes |
| 157 | 10.0 | 90.0 | Fibers, (deformed) spheres, flakes |
| 158 | 5.0 | 95.0 | Spheres, non-spheres, fibers |

TABLE 16

| No. | Organic solvent A Acetone (% by weight) | Organic solvent B1 Cyclohexanone (% by weight) | Shape of particles |
|---|---|---|---|
| 161 | 80.0 | 20.0 | Flakes (including flakes with many wrinkles) |
| 162 | 60.0 | 40.0 | Flakes (including flakes with many wrinkles) |
| 163 | 50.0 | 50.0 | Flakes (including flakes with many wrinkles) |
| 164 | 40.0 | 60.0 | Flakes (including flakes with many wrinkles) |
| 165 | 35.0 | 65.0 | Flakes (including flakes with many wrinkles), thick fibers |
| 166 | 30.0 | 70.0 | Thick fibers, fibers, flakes (with many wrinkles) |
| 167 | 25.0 | 75.0 | Fibers, thick fibers, (deformed) spheres |
| 168 | 20.0 | 80.0 | Spheres, non-spheres, fibers |

TABLE 17

| No. | Organic solvent A 2-propanol (% by weight) | Organic solvent B2 n-hexane (% by weight) | Shape of particles |
|---|---|---|---|
| 171 | 90.0 | 10.0 | Flakes (including flakes with many wrinkles) |
| 172 | 80.0 | 20.0 | Flakes (including flakes with many wrinkles) |
| 173 | 70.0 | 30.0 | Flakes (including flakes with many wrinkles) |
| 174 | 60.0 | 40.0 | Flakes (including flakes with many wrinkles), thick fibers |
| 175 | 50.0 | 50.0 | Flakes (including flakes with many wrinkles), thick fibers |
| 176 | 46.0 | 54.0 | Thick fibers, flakes (including flakes with many wrinkles) |
| 177 | 40.0 | 60.0 | Thick fibers |
| 178 | 30.0 | 70.0 | Fibers, (deformed) spheres |
| 179 | 25.0 | 75.0 | Fibers, spheres (including deformed spheres) |
| 180 | 20.0 | 80.0 | Spheres, non-spheres |

TABLE 18

| No. | Organic solvent A 2-propanol (% by weight) | Organic solvent B2 n-heptane (% by weight) | Shape of particles |
|---|---|---|---|
| 181 | 90.0 | 10.0 | Flakes (including flakes with many wrinkles) |
| 182 | 80.0 | 20.0 | Flakes (with many wrinkles) |
| 183 | 70.0 | 30.0 | Flakes (with wrinkles) |
| 184 | 60.0 | 40.0 | Flakes (with wrinkles) |
| 185 | 50.0 | 50.0 | Thick fibers, flakes (including flakes with many wrinkles) |
| 186 | 40.0 | 60.0 | Fibers, thick fibers |
| 187 | 30.0 | 70.0 | Fibers, (deformed) spheres |
| 188 | 22.0 | 78.0 | Non-spheres, spheres, fibers |
| 189 | 21.0 | 79.0 | Spheres, fibers |
| 190 | 20.0 | 80.0 | Non-spheres |

TABLE 19

| No. | Organic solvent A 1,4-dioxane (% by weight) | Organic solvent B2 n-heptane (% by weight) | Shape of particles |
|---|---|---|---|
| 191 | 90.0 | 10.0 | Flakes (including flakes with many wrinkles) |
| 192 | 85.0 | 15.0 | Flakes (with many wrinkles), (distorted) thick fibers |

TABLE 19-continued

| No. | Organic solvent A 1,4-dioxane (% by weight) | Organic solvent B2 n-heptane (% by weight) | Shape of particles |
|---|---|---|---|
| 193 | 80.0 | 20.0 | (Distorted) thick fibers, flakes (with many wrinkles) |
| 194 | 75.0 | 25.0 | (Distorted) thick fibers, fibers, (distorted) spheres |
| 195 | 73.0 | 27.0 | (Distorted) spheres, (distorted) thick fibers |
| 196 | 72.0 | 28.0 | Non-spheres, fibers |
| 197 | 70.0 | 30.0 | Non-spheres, fibers |
| 198 | 50.0 | 50.0 | Non-spheres |

As the affinity for water of the liquid into which droplets of a silica sol are introduced decreases, the shape of the particles shifts from flakes to fibers, and to spheres or non-spheres. The mixing ratio of the solvents that allows a high proportion of fibers varies depending on the types of the solvents.

In order to obtain flaky particles, an aqueous low-permittivity organic solvent is preferably used. However, as shown in Tables 5 to 19, at least part of the particles can be obtained in the form of flakes also by using a mixed solvent of an aqueous low-permittivity organic solvent (organic solvent A) and a non-aqueous low-permittivity organic solvent.

Example 5

Metal oxide powders were obtained in the same manner as in Example 1, except that metal oxide sols and organic solvents listed in Table 20 were used. The results are shown in Table 20.

TABLE 20

| | | Metal oxide sol | | | | |
|---|---|---|---|---|---|---|
| No. | Product name | Metal oxide | Particle diameter (nm) | pH | Organic solvent | Shape of particles |
| 201 | Ceramace S-8 | $SnO_2$ | 2 | 10 | 2-propanol | Flakes |
| 202 | Ceramace S-8 | $SnO_2$ | 2 | 10 | Acetone | Flakes |
| 203 | Ceramace S-8 | $SnO_2$ | 2 | 10 | Mixed solvent | Fibers, spheres |
| 204 | Biral Al-L7 | $Al_2O_3$ | 30 | 7 to 8 | 2-propanol | Flakes |
| 205 | Biral Al-L7 | $Al_2O_3$ | 30 | 7 to 8 | Acetone | Flakes |
| 206 | Biral Al-L7 | $Al_2O_3$ | 30 | 7 to 8 | 2-phenoxyethanol | Spheres |
| 207 | Needlal P-10 | $CeO_2$ | 8 | 7 | Mixed solvent | Spheres, flakes, fibers |
| 208 | Tynoc A-6L | $TiO_2$ | 10 | 10 | Mixed solvent | Spheres, flakes, fibers |
| 209 | SNOWTEX XL | $SiO_2$ | 40 to 60 | 9.0 to 10.0 | Mixed solvent | Spheres, thick fibers, flakes |
| 61 | SILICADOL 30S | $SiO_2$ | 7 to 10 | 9.0 to 10.5 | Mixed solvent | Flakes, fibers, spheres |

Figure 9:
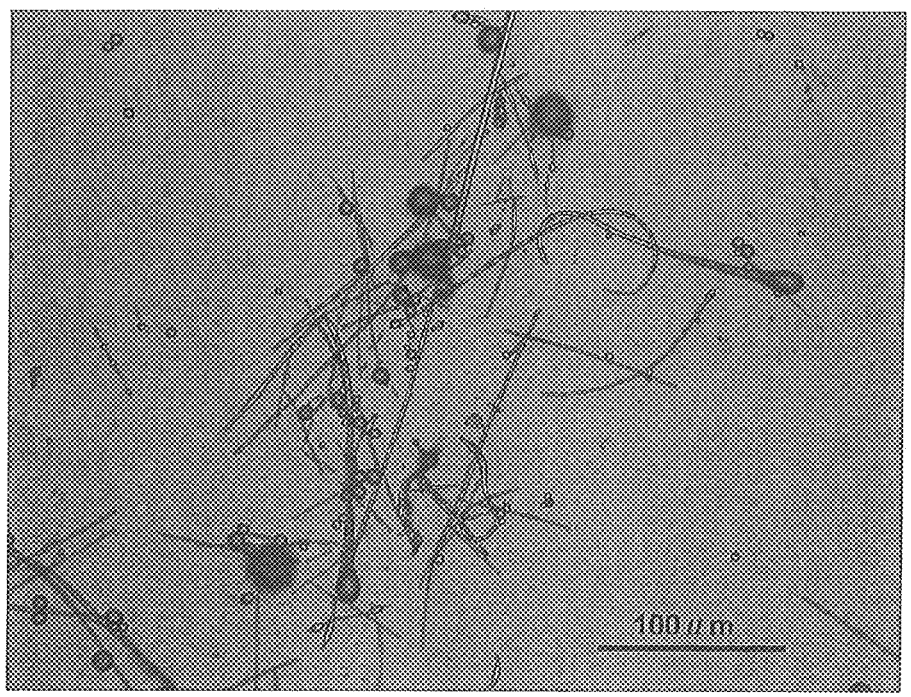
FIG. 9 shows fibrous and spherical tin oxide particles obtained from No. 203 ($SnO_2$ sol, organic solvent: 2-butoxyethanol 70+2-phenoxyethanol 30, see Table 20) of Example 5, as observed with an optical microscope.

"SNOWTEX XL" is manufactured by Nissan Chemical Industries, Ltd., and all of the other sols are manufactured by Taki Chemical Co., Ltd.
The particle diameters are particle diameters of metal oxide colloidal particles contained in the sols.
Mixed solvent = 2-butoxyethanol (70% by weight) + 2-phenoxyethanol (30% by weight)
An observation result of the powder obtained from No. 203 is shown in FIG. 9.

Example 6

Figure 10:
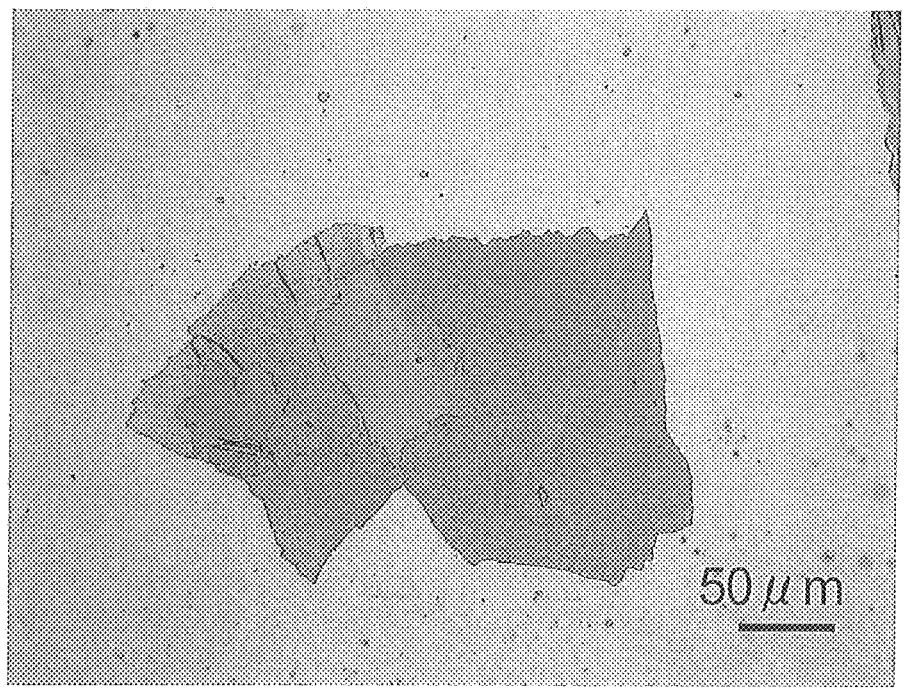
FIG. 10 shows flaky silica particles obtained in Example 6 by adding glycerin to a silica sol and dropping the silica sol into 2-propanol, as observed with an optical microscope.

A sol for dropping was prepared by mixing an alkaline silica sol ("SILICADOL 30S" manufactured by Nippon Chemical Industrial Co., Ltd.; see Example 1) and glycerin at a weight ratio of 80:20. An amount of 50 ml of 2-propanol was put in a beaker, and a total amount of 1 g of the sol for dropping was added in drops of 0.01 g each to the 2-propanol. During the dropping of the sol for dropping, the 2-propanol was stirred with a magnetic stirrer. Thereafter, the same steps as in Example 1 were performed to obtain a silica powder (see FIG. 10).

The particles obtained had a flaky shape, and had a thickness ranging from 0.3 µm to 0.4 µm. The thickness of the flaky particles was smaller than the thickness (0.5 µm to 0.7 µm) of flaky silica particles obtained without mixing glycerin with the sol.

It is thought that the decrease in the permittivity of the solvent between the colloidal particles was caused in a narrow region due to addition of an aqueous high-permittivity polar organic solvent (organic solvent a) such as glycerin, as a result of which the thickness of the particles was reduced. A similar tendency was observed also in the case where another aqueous high-permittivity polar organic solvent such as ethylene glycol was used instead of glycerin.

Example 7

Colloidal particles were aggregated in the same manner as in No. 3 of Example 1, and the aggregates were dried at 150° C. to obtain a flaky silica powder (average thickness: about 0.6 µm). The specific surface area and the pore distribution of this silica powder were measured by nitrogen adsorption method (BET method). The obtained results were that the specific surface area was 149 m$^2$/g, the average pore diameter was 20 nm, the pore volume was 0.732 cc/g, and the porosity was about 60%. The silica particles constituting the silica powder were so-called mesoporous bodies having mesopores. It was confirmed that the other powders obtained in the above Examples were also composed of mesoporous bodies.

Furthermore, the obtained silica powder was burned with an electric furnace set at 600° C. for 7 hours. The specific surface area etc. of the burned silica powder were measured by BET method. The obtained results were that the specific surface area was 111 m$^2$/g, the average pore diameter was 20 nm, the pore volume was 0.585 cc/g, and the porosity was about 55%. Even after the burning, the silica particles constituting the silica powder remained mesoporous bodies having a high porosity.

The mesopores as observed in the above are formed based on the fact that metal colloidal particles maintain spaces when the colloidal particles are aggregated in an organic solvent. If a metal oxide colloid is dried as it is, a highly porous powder having large pores as described above cannot be obtained.

The average pore diameter etc. of the mesoporous bodies can be adjusted by appropriately selecting a solvent. For example, there is a tendency that the larger the molecular weight of a solvent is, the greater the average pore diameter is. There is also a tendency that the larger the specific gravity of a metal oxide of a metal oxide colloid used is, the greater the pore volume is.

Example 8

An amount of 500 g of titania fine particles ("MT-100AQ" manufactured by Tayca Corporation) and 42 g of an ammonium polyacrylate surfactant ("HYDROPALAT 5050" manufactured by Cognis Corporation) were added to 1125 g of pure water. The mixture was stirred and circulated (stirring speed: a circumferential speed of 8 m/sec, flow rate: 1 L/min) for 2 hours together with 4 kg of zirconia beads of 0.65 mm diameter using a horizontal continuous wet-type stirred media mill (DYNO-MILL KDL-PILOT A manufactured by Shinmaru Enterprises Corporation). Thus, a dispersion liquid of the titania fine particles was obtained.

A sol for dropping was prepared by mixing 4.29 g of the dispersion liquid and 10.0 g of an alkaline silica sol ("SILICADOL 30S" manufactured by Nippon Chemical Industrial Co., Ltd.). An amount of 200 ml of 2-propanol was put in a beaker. While the 2-propanol was stirred with a propeller-type stirring rod (rotational speed: 1000 rpm), a total amount of 51 g of the sol for dropping was added to the 2-propanol by causing drops of 0.03 g each of the sol to fall from 10 locations concurrently. Aggregates were formed by the dropping.

Figure 11:
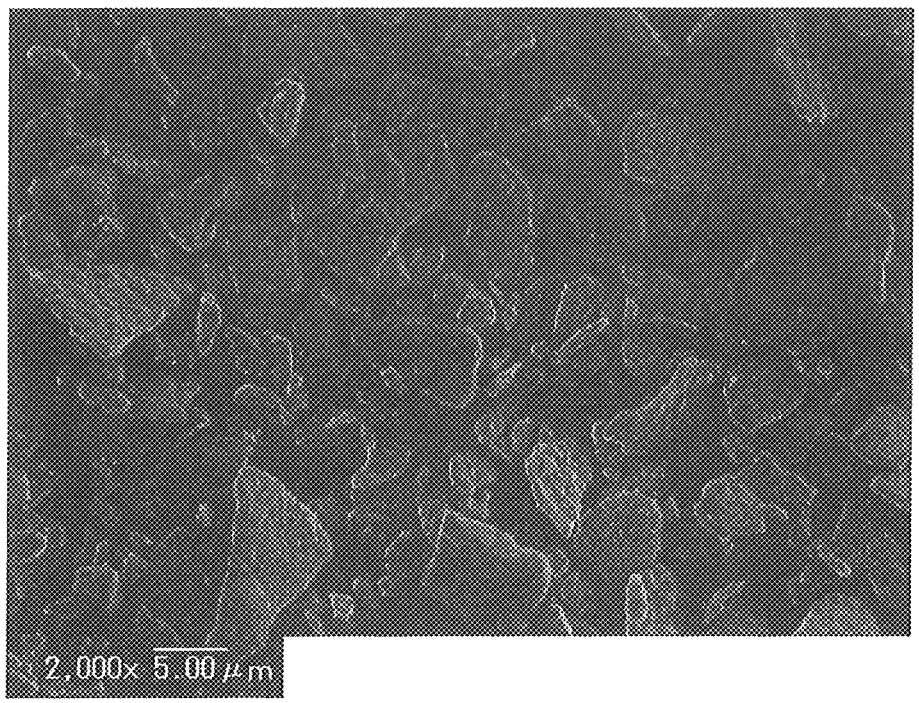
FIG. 11 shows flaky silica particles obtained in Example 8 and including internally titanium oxide (titania) fine particles, as observed with a SEM.

The aggregates were separated from the solvent (2-propanol) by decantation, dried in a vacuum dryer set at 120° C., and then burned at 600° C. for 5 hours to obtain a flaky silica powder A (average thickness: 0.7 μm, average particle diameter: 4 μm, titania content: about 30% by weight) internally including the titania fine particles (see FIG. 11). Here, the average particle diameter denotes a particle diameter (D50) corresponding to the cumulative volume of 50% in the particle size distribution measured with a laser diffraction granulometer (Microtrac HRA manufactured by Nikkiso Co., Ltd.).

The specific surface area and the pore distribution of the titania fine particle-including silica powder A were measured by nitrogen adsorption method (BET method). The specific surface area was 160 m$^2$/g, the average pore diameter was 16 nm, the pore volume was 0.550 cc/g, and the porosity was about 55%.

For comparison, a titania fine particle-including silica powder B obtained by peeling a film from a substrate was fabricated as described below. The above sol for dropping was applied by a bar coater onto a stainless steel plate having been previously heat-treated at 250° C. for 1 hour, and then was dried at 150° C. A film in which cracks were generated by the drying was scraped to obtain a powder. The powder was burned at 600° C. for 5 hours to obtain the flaky silica powder B (average thickness: 0.8 μm, average particle diameter: 4 μm, titania content: about 30% by weight). The silica powder B was evaluated by BET method. The specific surface area was 150 m$^2$/g, the average pore diameter was 4 nm, the pore volume was 0.241 cc/g, and the porosity was about 35%.

Figure 12:
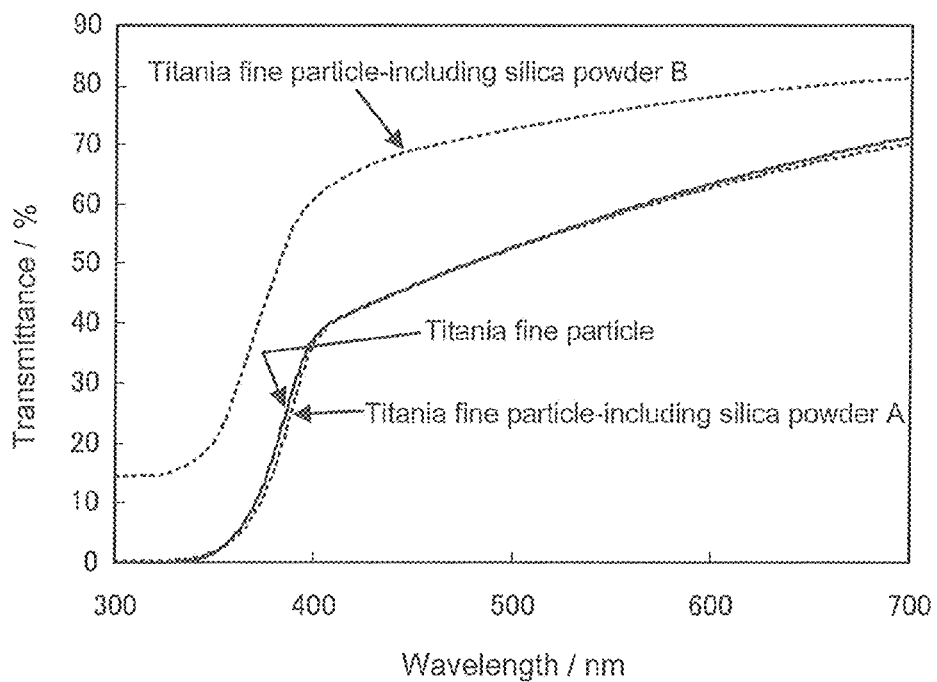
FIG. 12 shows spectral transmittance curves for titania fine particle-including silica particles obtained in Example 8, and for the same amount of titania fine particles as included in the silica particles.

The silica powder A was dispersed in pure water in an amount of 0.33% by weight, and the dispersion liquid was put in a quartz cell having an optical path length of 0.2 mm. The total transmittances for visible light and ultraviolet light were measured with a visible-ultraviolet spectrophotometer (UV-3600 manufactured by Shimadzu Corporation). The transmittance curve of the silica powder A approximately agreed with a transmittance curve obtained from a 0.1 wt % dispersion liquid of titania fine particles ("MT-100AQ" manufactured by Tayca Corporation) that was prepared so that the amount of titania was equal to that in the dispersion liquid of the silica powder A (see FIG. 12). It was confirmed that titania in the titania fine particle-including silica powder A effectively shielded against ultraviolet ray. From the transmittance curve of the silica powder B obtained by the same measurement as above, it was confirmed that the ultraviolet shielding performance of the silica powder B was inferior to the ultraviolet shielding performance of the silica powder A. It is thought that, in the silica powder B, the projective overlap between the titania fine particles was large because the uniformity of distribution of the titania fine particles was insufficient.

Example 9

A sol for dropping was prepared by mixing 30% by weight of an aqueous dispersion liquid (fine particle concentration: 30% by weight) of the titania fine particles described in Example 8 ("MT-100AQ" manufactured by Tayca Corporation) and 70% by weight of an alkaline silica sol ("SILICADOL 30S" manufactured by Nippon Chemical Industrial Co., Ltd.; silica content in terms of $SiO_2$ content: 30% by weight). A total amount of 1 g of the sol for dropping was added in drops of 0.01 g each to an organic solvent (2-propanol) which was being stirred, and aggregates were thus obtained in the form of a slurry. The aggregates were collected by volatilizing the organic solvent, and then the aggregates were pulverized. Subsequently, the pulverized aggregates were burned at 600° C. for 7 hours to obtain a silica powder internally including titania fine particles. Flaky particles accounted for more than 90% of the obtained silica powder.

The above silica powder was observed with a SEM. It was found that the silica powder was composed of flaky particles having a thickness of about 0.7 μm. In addition, the average particle diameter (D50) measured with the laser diffraction granulometer described above was 4.0 μm (4.04 μm).

The silica powder internally including the titania fine particles was dispersed in water so that the particle weight concentration (PWC) was 0.33% by weight (titania fine particle concentration: 0.1% by weight). The dispersion liquid was put in a cell having an optical path length of 2 mm. The transmittance at a wavelength of 300 nm was 0.2%, as measured with a spectrophotometer. In addition, a dispersion liquid was prepared by mixing the silica powder with water so that the PWC was 0.1% by weight (titania fine particle concentration: 0.03% by weight). The transmittance of the dispersion liquid at a wavelength of 300 nm was 14.7%.

Furthermore, silica powders internally including titania fine particles at various concentrations were fabricated. Each of the obtained silica powders was dispersed in water so that the titania fine particle concentration was 0.1% by weight, and the transmittance at a wavelength of 300 nm was measured in the same manner as above. In addition, each of the obtained silica powders was dispersed in water so that the particle weight concentration (PWC) was 0.1% by weight, and the transmittance at a wavelength of 300 nm was measured in the same manner as above. The results are shown in Table 21. When a sol for dropping containing titania fine particles at a concentration of 60% by weight or more was used, no aggregate was obtained.

TABLE 21

| No | Titania fine particle content in particles (% by weight) | Transmittance at wavelength of 300 nm (%) Titania fine particles 0.1% | PWC 0.1% | Average particle diameter D50 (μm) | Proportion of flaky particles (%) |
|---|---|---|---|---|---|
| 211 | 10 | 0.0 | 34.7 | 6.97 | >90 |
| 212 | 20 | 0.1 | 22.2 | 6.65 | >90 |
| 213 | 25 | 0.1 | 18.4 | 4.41 | >90 |
| 214 | 30 | 0.2 | 14.7 | 4.04 | >90 |
| 215 | 35 | 0.4 | 14.2 | 3.60 | ≃80 |
| 216 | 40 | 1.2 | 16.3 | 4.10 | ≃50 |
| 217 | 50 | 8.5 | 27.7 | 4.58 | ≃0 |

Figure 13:
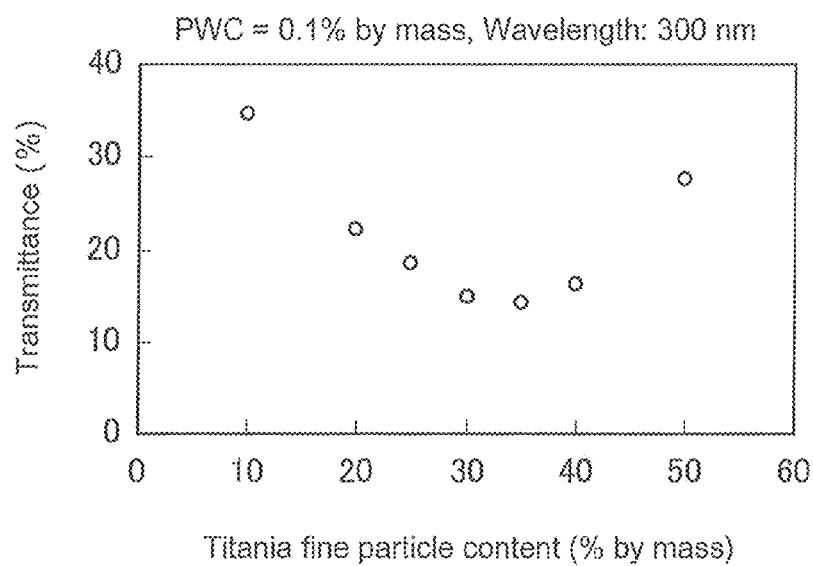
FIG. 13 is a diagram showing the relation between the titania fine particle concentration and the light transmittance (wavelength: 300 nm) in a titania fine particles-including silica powder obtained in Example 9 and having a particle weight concentration (PWC) of 0.1% by weight.

FIG. 13 shows the light transmittances at a wavelength of 300 nm of the dispersion liquids in which the PWC was 0.1% by weight. In the range where the content of the titania fine particles in the silica particles is 35% by weight or less, as the content of the titania fine particles increases, the transmittance decreases due to the ultraviolet shielding effect of the titania fine particles. However, in the range where the content of the titania fine particles is more than 35% by weight, the transmittance increases despite increase in the amount of the titania fine particles. This means that the probability of the titania fine particles being present in the flaky particles at such positions as to overlap each other was increased, and the proportion of titania fine particles that contribute to light absorption was accordingly reduced. In view of this fact, the proportion of ultraviolet-absorbing particles added to metal oxide particles is preferably 20% by weight to 45% by weight, more preferably 25% by weight to 40% by weight, and particularly preferably 27% by weight to 38% by weight.

However, the higher the proportion of the titania fine particles in the sol to be dropped is, the lower the proportion of particles obtained in the form of flakes is. In the case where particles should be obtained in the form of flakes, the proportion of ultraviolet-absorbing particles added to metal oxide particles is preferably 35% by weight or less, and particularly preferably 30% by weight or less.

Example 10

An amount of 4.67 g of an alkaline silica sol ("SILICA-DOL 30S" manufactured by Nippon Chemical Industrial Co., Ltd., and containing 30% by weight of silica in terms of $SiO_2$ content) and 2.40 g of an aqueous dispersion of carbon black ("WD-CB2" manufactured by Daito Kasei Kogyo Co., Ltd., and containing 25% by weight of carbon black) were mixed to obtain a dropping liquid 1 in which the weight ratio between carbon black and silica (in terms of $SiO_2$ content) was 30:70.

An amount of 3.33 g of an alkaline silica sol ("SILICA-DOL 30S" manufactured by Nippon Chemical Industrial Co., Ltd., and containing 30% by weight of silica in terms of $SiO_2$ content) and 4.00 g of an aqueous dispersion of carbon black ("WD-CB2" manufactured by Daito Kasei Kogyo Co., Ltd., and containing 25% by weight of carbon black) were mixed to obtain a dropping liquid 2 in which the weight ratio between carbon black and silica (in terms of $SiO_2$ content) was 50:50.

An amount of 20 ml of each of the organic solvents listed in Table 22 was put in a glass bottle, and a total amount of 0.5 g of the dropping liquid 1 or 2 was added in drops of 0.01 g each to the organic solvent while the organic solvent was stirred with a magnetic stirrer (rotational speed: 800 rpm).

Aggregates formed by the dropping were suction-filtered, washed with 2-propanol, and then dried by a dryer set at 150° C., to obtain a silica powder internally including carbon black fine particles. The shapes of the obtained particles were observed with an optical microscope. The results are shown in Table 22.

TABLE 22

| No | Organic solvent | | Dropping liquid | Shape of particles |
|---|---|---|---|---|
| 221 | 2-propanol | | Dropping liquid 1 | Flakes |
| 222 | 2-propanol 2-ethyl-1-hexanol | 60% by weight 40% by weight | Dropping liquid 1 | Fibers |
| 223 | 2-propanol | | Dropping liquid 2 | Flakes |
| 224 | 2-propanol 2-ethyl-1-hexanol | 60% by weight 40% by weight | Dropping liquid 2 | Thick fibers |

Figure 14:
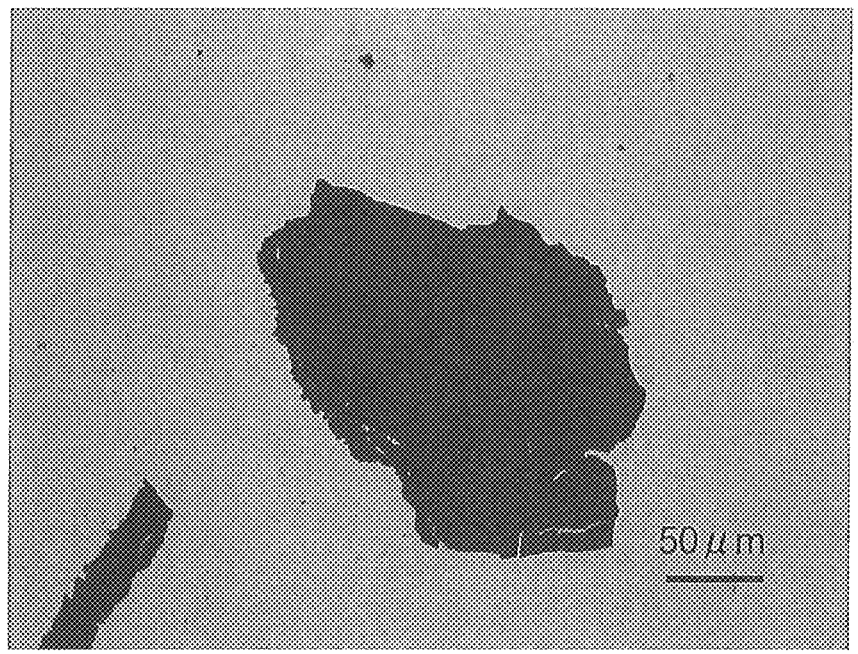
FIG. 14 shows flaky silica particles obtained from No. 223 (organic solvent: 2-propanol, see Table 22) of Example 10 and including internally carbon black fine particles, as observed with an optical microscope.
Figure 15:
FIG. 15 shows thick fibrous silica particles obtained from No. 224 (organic solvent: 2-propanol 60+2-ethyl-1-hexanol 40, see Table 22) of Example 10 and including internally carbon black fine particles, as observed with an optical microscope.

An observation result of the powder obtained from No. 223 is shown in FIG. 14, and an observation result of the powder obtained from No. 224 is shown in FIG. 15.

Example 11

A sol for dropping was obtained by mixing an alkaline silica sol whose major cation is ammonium ion ("SNOWTEX-N" manufactured by Nissan Chemical Industries, Ltd.) and a tin oxide sol ("Ceramace S-8" manufactured by Taki Chemical Co., Ltd.; tin oxide content in terms of $SnO_2$ content: 8%) so that the weight ratio between $SiO_2$ and $SnO_2$ was 2:1. A powder containing silica and tin oxide was obtained in the same manner as in Example 1 except that the sol for dropping was used. It should be noted that the organic solvent used was 2-propanol. The amount of the obtained powder was about 0.1 g.

For comparison, a powder was obtained in the same manner as above except that the entire amount of the sol for dropping was substituted by the above alkaline silica sol "SNOWTEX-N". The amount of the obtained powder was 0.001 g.

Example 12

An amount of 50 ml of each of the organic solvents listed in Table 23 was put in a beaker. A total amount of 1 g of an alkaline silica sol whose major cation is ammonium ion ("SNOWTEX-N" manufactured by Nissan Chemical Industries, Ltd.) was added in drops of 0.01 g each to the organic solvent. During the dropping of the alkaline silica sol, the organic solvent was stirred with a magnetic stirrer (rotational speed: 800 rpm). Through this operation, it was visually observed that the colloidal particles were aggregated to form a slurry in the organic solvent.

Next, the aggregates of the colloidal particles were separated by suction filtration from the solvent in which the colloidal particles had been aggregated to form a slurry. The obtained aggregates of the colloidal particles were dried in a vacuum dryer set at 150° C., to obtain a silica powder (an assemblage of flaky silica particles). Finally, the dried silica powder was burned at 700° C. for 5 hours. The weight of the obtained powder was about 0.19 g for each of the organic solvents. Ammonium ion in each organic solvent is thought to have facilitated aggregation of the metal oxide colloidal particles, considering that the weight of a powder obtained by using an organic solvent containing no ammonium ion is about 0.001 g, which is extremely small. In addition, the sodium concentration in the silica powder was about 0.1% by weight in terms of oxide content (in terms of $Na_2O$ content), as measured by chemical analysis.

For comparison, a silica powder (an assemblage of flaky silica particles) was obtained in the same manner as above, except that "SILICADOL 30" (manufactured by Nippon Chemical Industrial Co., Ltd.), which is a metal oxide sol whose major cation is sodium ion, was used instead of "SNOWTEX-N", and that 2-propanol was used as the organic solvent. The sodium concentration in the silica powder was about 1.6% by weight in terms of oxide content (in terms of $Na_2O$ content), as measured by chemical analysis.

TABLE 23

| No | Organic solvent | | Blending amount of ammonia source (g) | Ammonia concentration (% by weight) |
|---|---|---|---|---|
| | Blending amount of 2-propanol (g) | Ammonia source | | |
| 221 | 49.85 | Concentrated aqueous ammonia | 0.15 | 0.084 |
| 222 | 49.5 | Concentrated aqueous ammonia | 0.5 | 0.28 |
| 223 | 45 | Concentrated aqueous ammonia | 5 | 2.8 |
| 224 | 49.5 | Ammonium acetate | 0.5 | 0.29 |
| 225 | 49.95 | Ammonium acetate | 0.05 | 0.029 |
| 226 | 42.5 | Ammonium benzoate A | 7.5 | 0.21 |
| 227 | 47.5 | Ammonium benzoate A | 2.5 | 0.070 |
| 228 | 46 | Ammonium benzoate B | 4 | 0.022 |

The concentration of the concentrated aqueous ammonia is 28%.
The ammonium benzoate A is an aqueous solution having a concentration of 11.43%, and B is an aqueous solution having a concentration of 2.29%.

The invention claimed is:

1. A mesoporous particle having a flaky shape comprising aggregated particles of at least one metal oxide selected from silicon oxide, titanium oxide, zirconium oxide, aluminum oxide, tantalum oxide, niobium oxide, cerium oxide, and tin oxide, having a single-layer structure, having a thickness of 0.1 μm to 3 μm, and having an average pore diameter of 10 nm or more, and containing titanium oxide in an amount of 20% to 45% by weight.

2. The mesoporous particle according to claim 1, comprising metal oxide particles aggregated in such a manner as to form mesopores between the metal oxide particles.

3. The mesoporous particle according to claim 1, having a specific surface area of 50 $m^2$/g to 500 $m^2$/g.

4. The mesoporous particle according to claim 1, having a sodium concentration of 0.001% by weight to 0.7% by weight in terms of $Na_2O$ content.

5. The mesoporous particle according to claim 1, wherein the thickness is 0.7 μm or less.

6. The mesoporous particle according to claim 5, wherein the thickness is 0.4 μm or less.

7. The mesoporous particle according to claim 1, having a pore volume of 0.17 cc/g or more.

8. The mesoporous particle according to claim 7, wherein the pore volume is 0.5 cc/g or more.

9. The mesoporous particle according to claim 8, wherein the pore volume is 0.7 cc/g or less.

10. The mesoporous particle according to claim 1, wherein the average pore diameter is 30 nm or less.

11. A mesoporous particle having a flaky shape comprising aggregated particles of at least one metal oxide selected from silicon oxide, titanium oxide, zirconium oxide, aluminum oxide, tantalum oxide, niobium oxide, cerium oxide, and tin oxide, having a single-layer structure, having a thickness of 0.1 μm to 3 μm, having an average pore diameter of 15 nm to 40 nm, and having a specific surface area of 50 $m^2$/g to 300 $m^2$/g without a surfactant.

12. The mesoporous particle according to claim 11, comprising metal oxide particles aggregated in such a manner as to form mesopores between the metal oxide particles.

13. The mesoporous particle according to claim 11, internally including a functional material functioning as at least one selected from a water repellent agent, an antibacterial agent, an ultraviolet absorber, an infrared absorber, a coloring agent, an electric conductor, a heat conductor, a fluorescent material, and a catalyst.

14. The mesoporous particle according to claim 11, having a sodium concentration of 0.001% to 0.7% by weight in terms of $Na_2O$ content.

15. The mesoporous particle according to claim 11, wherein the thickness is 0.7 μm or less.

16. A mesoporous particle having a flaky shape, having a single-layer structure, having a thickness of 0.1 μm to 3 μm, having an average pore diameter of 10 nm or more, and comprising metal oxide particles aggregated in such a manner as to form mesopores between the metal oxide particles without a surfactant, wherein the metal oxide particles consist of silicon oxide.

17. The mesoporous particle according to claim 16, wherein the thickness is 0.4 μm or less.

18. The mesoporous particle according to claim 16, having a specific surface area of 50 $m^2$/g to 500 $m^2$/g.

19. The mesoporous particle according to claim 16, internally including a functional material functioning as at least one selected from a water repellent agent, an antibacterial agent, an ultraviolet absorber, an infrared absorber, a coloring agent, an electric conductor, a heat conductor, a fluorescent material, and a catalyst.

20. The mesoporous particle according to claim 16, having a sodium concentration of 0.001% to 0.7% by weight in terms of $Na_2O$ content.

21. The mesoporous particle according to claim 16, wherein the thickness is 0.7 μm or less.

22. A method for producing the mesoporous particle according to claim 1, the method comprising the steps of:
feeding a metal oxide sol having a pH of 7 or higher and containing metal oxide colloidal particles as dispersoids and water as a dispersion medium, into a liquid containing a water-miscible solvent that is a protic solvent having a relative permittivity of 30 or lower at 20° C., or that is an aprotic solvent having a relative permittivity of 40 or lower at 20° C., and thereby forming a flaky aggregate of the metal oxide colloidal particles in the liquid; and
subjecting the flaky aggregate to at least one treatment selected from drying, heating, and pressurization, to increase a binding force between the metal oxide colloidal particles constituting the flaky aggregate, and thereby converting the flaky aggregate into a flaky particle that is insoluble in water.

* * * * *